(12) United States Patent
Xian et al.

(10) Patent No.: US 11,838,026 B2
(45) Date of Patent: Dec. 5, 2023

(54) METHOD OF AND APPARATUS FOR CONTROLLING CLOCK SIGNAL

(71) Applicants: TAIWAN SEMICONDUCTOR MANUFACTURING COMPANY, LTD., Hsinchu (TW); TSMC NANJING COMPANY, LIMITED, Jiangsu (CN)

(72) Inventors: Huaixin Xian, Hsinchu (TW); Liu Han, Hsinchu (TW); Jing Ding, Hsinchu (TW); Qingchao Meng, Hsinchu (TW)

(73) Assignees: TAIWAN SEMICONDUCTOR MANUFACTURING COMPANY, LTD., Hsinchu (TW); TSMC NANJING COMPANY, LIMITED, Nanjing (CN)

( * ) Notice: Subject to any disclaimer, the term of this patent is extended or adjusted under 35 U.S.C. 154(b) by 0 days.

(21) Appl. No.: 17/362,305

(22) Filed: Jun. 29, 2021

(65) Prior Publication Data
US 2022/0405456 A1 Dec. 22, 2022

(30) Foreign Application Priority Data
Jun. 21, 2021 (CN) .......................... 202110685173.1

(51) Int. Cl.
*H03K 5/135* (2006.01)
*G06F 1/04* (2006.01)
(Continued)

(52) U.S. Cl.
CPC .............. *H03K 5/135* (2013.01); *G06F 1/04* (2013.01); *G06F 30/392* (2020.01); *H03K 3/037* (2013.01);
(Continued)

(58) Field of Classification Search
CPC .. H03K 3/012; H03K 3/0233; H03K 3/35613; H03K 3/356139; H03K 5/135; G06F 1/04; G06F 1/10
See application file for complete search history.

(56) References Cited

U.S. PATENT DOCUMENTS 9,887,698 B2 * 2/2018 Liu ...................... H03K 19/20
10,461,747 B2 * 10/2019 Venugopal ......... H03K 19/0016
(Continued)

FOREIGN PATENT DOCUMENTS

TW 242453 3/1995
TW 526607 4/2003
(Continued)

*Primary Examiner* — Patrick O Neill
(74) *Attorney, Agent, or Firm* — Hauptman Ham, LLP

(57) ABSTRACT

An integrated circuit includes a clocking transistor, a first enabling transistor, a second enabling transistor, a branch-one transistor, a branch-two transistor, and a clock gating circuit. The first enabling transistor is coupled between the clocking transistor and a first node. The second enabling transistor is coupled between the clocking transistor and a second node. The branch-one transistor is coupled between a first power supply and the first node. The gate terminal of the branch-one transistor is electrically connected to the second node. The branch-two transistor is coupled between the first power supply and the second node. The gate terminal of the branch-two transistor is electrically connected to the first node. The clock gating circuit for generating a gated clock signal receives a latch output signal which is latched to a logic level of either a first node signal or a second node signal.

20 Claims, 21 Drawing Sheets

(51) Int. Cl.
*G06F 30/392* (2020.01)
*H03K 3/037* (2006.01)
*H03K 17/687* (2006.01)
*G06F 117/04* (2020.01)

(52) U.S. Cl.
CPC ...... *H03K 17/6872* (2013.01); *G06F 2117/04* (2020.01)

(56) References Cited

U.S. PATENT DOCUMENTS

| | | |
|---|---|---|
| 2003/0146776 A1 | 8/2003 | Nakase |
| 2003/0173995 A1 | 9/2003 | Cairns et al. |
| 2007/0008024 A1* | 1/2007 | Cheng ........................ G06F 1/04 327/291 |
| 2015/0162910 A1* | 6/2015 | Liu ........................ H03K 3/033 326/98 |
| 2016/0077544 A1* | 3/2016 | Tzeng ........................ G06F 1/10 327/291 |
| 2017/0287559 A1 | 10/2017 | Chen et al. |
| 2021/0184657 A1* | 6/2021 | Yu ........................ H03K 19/20 |
| 2022/0294429 A1* | 9/2022 | Coban ................ H03K 5/15013 |

FOREIGN PATENT DOCUMENTS

| | | |
|---|---|---|
| TW | 201604866 | 2/2016 |
| TW | 201937184 | 9/2019 |

* cited by examiner

METHOD OF AND APPARATUS FOR CONTROLLING CLOCK SIGNAL

BACKGROUND

The recent trend in miniaturizing integrated circuits (ICs) has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout designs for integrated circuits while ensuring that the standard cell layout design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
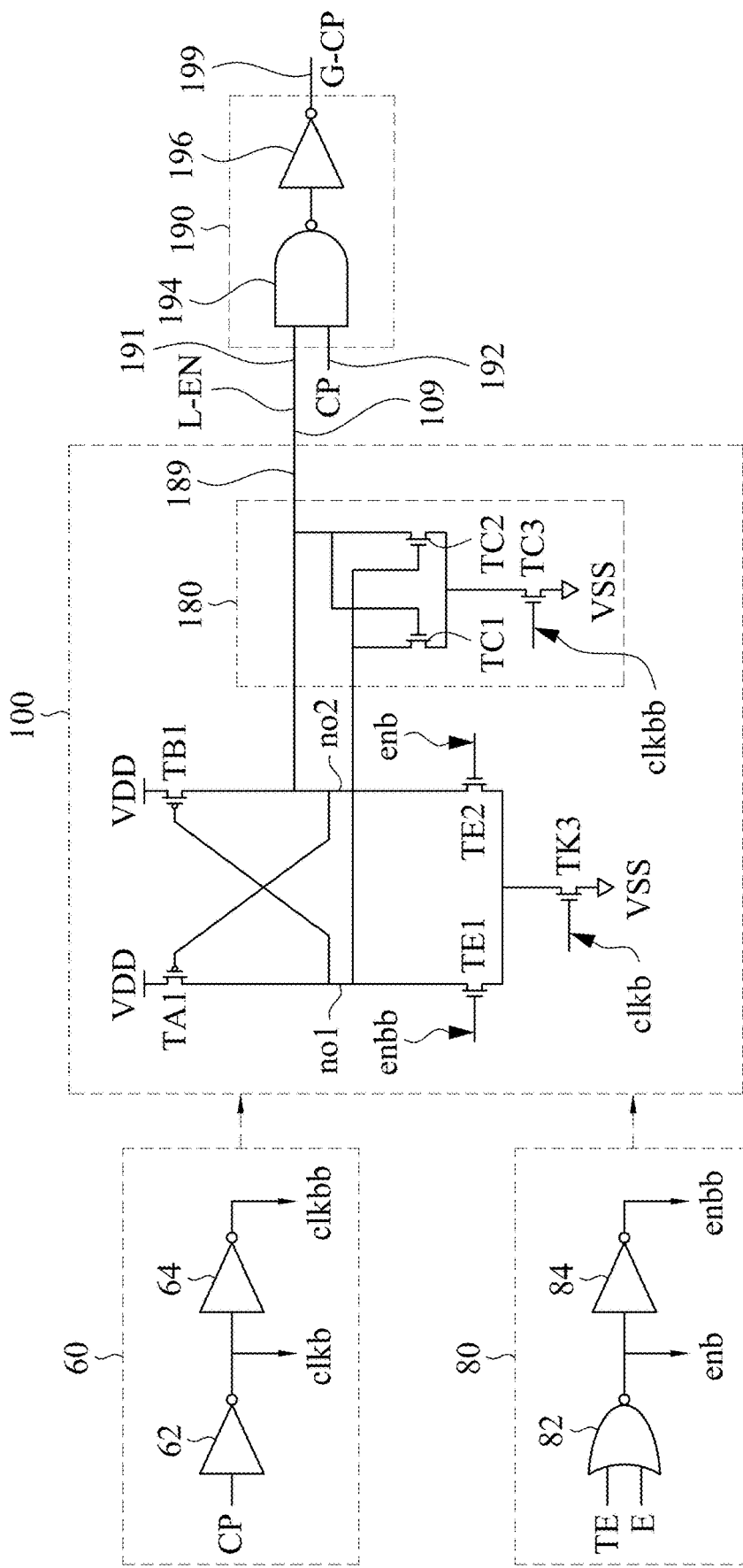
FIG. 1 is a circuit diagram of an integrated circuit having an enabling latch circuit configured to generate a latch output signal, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a latch output signal is generated from an enable signal and a clock signal with an integrated circuit that has an enabling latch circuit. The clock signal is gated with the latch output signal to generate a gated clock signal. The gated clock signal is coupled to the clock input of a synchronous logic circuit. When the latch output signal is at a first logic level, the synchronous logic circuit operates in the normal operation mode and is synchronized with the gated clock signal. When the latch output signal is at a second logic level; however, the synchronous logic circuit operates in the idle operation mode. The changing of the logic levels of the latch output signal depends upon the enable signal and the clock signal. In some embodiments, the latch output signal is latched to the logic level of the enable signal at a rising edge of the clock signal and lasts until the next falling edge of the clock signal. In some embodiments, the latch output signal is latched to the logic level of the enable signal at a falling edge of the clock signal and lasts until the next rising edge of the clock signal. The latching of the latch output signal is provided by the enabling latch circuit. Some transistors in the enabling latch circuit are clock coupling transistors that have gate terminals set to logic levels controlled by the clock signal. In some embodiments, the power consumption of the integrated circuit having the enabling latch circuit is reduced when the number of the clock coupling transistors in the enabling latch circuit is reduced.

FIG. 1 is a circuit diagram of an integrated circuit having an enabling latch circuit 100 configured to generate a latch output signal L-EN, in accordance with some embodiments. In FIG. 1, the enabling latch circuit 100 is configured to generate a latch output signal L-EN at an output 109. The latch output signal L-EN is received by a clock gating circuit 190 at a first input terminal 191. The clock gating circuit 190 has a second input terminal 192 configured to receive a clock signal CP. The gated clock signal G-CP at an output terminal 199 of the clock gating circuit 190 is generated from the clock signal CP by gating the clock signal CP with the latch output signal L-EN. In some embodiments, the gated clock signal G-CP changes with the clock signal CP when the latch output signal L-EN is at a logic HIGH, but the gated clock signal G-CP remains at a logic LOW when the latch output signal L-EN is at logic LOW. In some embodiments, the clock signal CP is a global clock signal, and the gated clock signal G-CP is a gated global clock signal. The clock gating circuit 190 includes a NAND gate 194 and an inverter 196, and the output of the NAND gate 194 is coupled to the input of the inverter 196. The two input terminals of NAND gate 194 correspond to the first input terminal 191 and the second input terminal 192 of the clock gating circuit 190. The circuit implementation of the clock gating circuit 190 in FIG. 1 is just one example, and other embodiments of the clock gating circuit 190 are within the contemplated scope of the present disclosure.

In FIG. 1, the latch output signal L-EN at the output 109 of the enabling latch circuit 100 is generated based on the clock signals and the enabling signals received by the enabling latch circuit 100. The clock signals clkb and clkbb received by the enabling latch circuit 100 are generated by the clock logic circuit 60. The clock logic circuit 60 includes a first inverter 62 and a second inverter 64, and the output of the first inverter 62 is coupled to the input of the second inverter 64. The clock signal CP is received by the clock logic circuit 60 at the input of the first inverter 62. The clock signal clkb generated at the output of the first inverter 62 is transmitted to the input of the second inverter 64, and the clock signal clkbb is generated at the output of the second inverter 64.

In FIG. 1, the enabling signals enb and enbb received by the enabling latch circuit 100 are generated by the enabling logic circuit 80. The enabling logic circuit 80 includes a NOR gate 82 and an inverter 84, and the output of the NOR gate 82 is coupled to the input of the inverter 84. The first input and the second input of the NOR gate 82 receive correspondingly the enable signal TE and the enable signal E. The enabling signal enb generated at the output of the NOR gate 82 is transmitted to the input of the inverter 84, and the enabling signal enbb is generated at the output of the inverter 84. In FIG. 1, when either one of the enable signal TE or the enable signal E is logic HIGH, the enabling signal enb is at the logic LOW and the enabling signal enbb is at the logic HIGH. When both of the enable signal TE and the enable signal E are logic LOW, the enabling signal enb is at the logic HIGH and the enabling signal enbb is at the logic LOW. In some embodiments, the enable signal TE is an enabling all signal for enabling all clock signals for the synchronous logic circuits in a part of an integrated circuit, while the enable signal E is an enabling signal which enables the clock signal for an individual block of synchronous logic circuits in a part of an integrated circuit.

In FIG. 1, the enabling latch circuit 100 includes a clocking transistor TK3, an enabling transistor TE1, an enabling transistor TE2, a branch-one transistor TA1, a branch-two transistor TB1, and a coupling circuit 180. The semiconductor channel of the enabling transistor TE1 is electrically connected between the drain terminal of the clocking transistor TK3 and a first node no1. In other words, the source terminal of the enabling transistor TE1 is electrically connected to the drain terminal of the clocking transistor TK3, and the drain terminal of the enabling transistor TE1 is electrically connected to the first node no1. The semiconductor channel of the enabling transistor TE2 is electrically connected between the drain terminal of the clocking transistor TK3 and a second node no2. In other words, the source terminal of the enabling transistor TE2 is electrically connected to the drain terminal of the clocking transistor TK3, and the drain terminal of the enabling transistor TE2 is electrically connected to the second node no2. The source terminal of the clocking transistor TK3 is electrically connected to the power supply VSS. The gate terminal of the clocking transistor TK3 receives the clock signal clkb from the output of the first inverter 62 in the clock logic circuit 60. The gate terminal of the enabling transistor TE1 receives enabling signal enbb from the output of the inverter 84 in the enabling logic circuit 80. The gate terminal of the enabling transistor TE2 receives enabling signal enb from the output of the NOR gate 82 in the enabling logic circuit 80.

The branch-one transistor TA1 has a semiconductor channel electrically connected between the power supply VDD and the first node no1, and the gate terminal of the branch-one transistor TA1 is electrically connected to the second node no2. The semiconductor channel of the branch-two transistor TB1 is electrically connected between the power supply VDD and the second node no2, and the gate terminal of the branch-two transistor TB1 is electrically connected to the first node no1.

The first node no1 and the second node no2 are electrically connected to a coupling circuit 180. The coupling circuit 180 has an output terminal 189 which supplies the latch output signal L-EN from the first node signal at the first node no1 and/or the second node signal at the second node no2. In some embodiments, the latch output signal L-EN generated by the coupling circuit 180 is latched to the logic level of the first node signal received by the coupling circuit 180 from the first node no1 at the time of latching. The latch output signal L-EN generated by the coupling circuit 180 is latched to the logic level of the second node signal received by the coupling circuit 180 from the second node no2 at the time of latching.

In FIG. 1, the coupling circuit 180 includes a coupling transistor TC1, a coupling transistor TC2, and a coupling transistor TC3. The gate terminal of the coupling transistor TC1 is electrically connected to the second node no2, and the drain terminal of the coupling transistor TC1 is electrically connected to the first node no1. The gate terminal of the second coupling transistor TC2 is electrically connected to the first node no1, and the drain terminal of the second coupling transistor TC2 is electrically connected to the second node no2. The source terminal of the first coupling transistor TC1 and the source terminal of the second coupling transistor TC2 are electrically connected to the drain terminal of the third coupling transistor TC3. The source terminal of the third coupling transistor TC3 is electrically connected to the power supply VSS. The gate terminal of the third coupling transistor TC3 receives the clock signal clkbb from the output of the second inverter 64 in the clock logic circuit 60.

In operation, the clock signal CP is received at the input of the first inverter 62 and at the second input terminal 192 of the clock gating circuit 190. The enable signal TE and the enable signal E are received at the inputs of the NOR gate 82. The gated clock signal G-CP is generated at the output terminal 199 of the clock gating circuit 190. When the enable signal TE is kept at logic LOW, the enabling signal enb at the output of the NOR gate 82 and the enabling signal enbb at the output of the inverter 84 are determined by the logic level of the enable signal E.

When the clock signal CP is at logic LOW, the logic HIGH of the clock signal clkb at the gate terminal of the clocking transistor TK3 drives the clocking transistor TK3 into the conducting state, and the logic LOW of the clock signal clkbb at the gate terminal of the coupling transistor TC3 drives the coupling transistor TC3 into the non-conducting state. When the clocking transistor TK3 is in the conducting state, each of the first node signal at the first node no1 and the second node signal at the second node no2 changes with the enable signal E. If the enable signal E is at logic LOW, the enabling transistor TE1 is turned off by the logic LOW of the enabling signals enbb, and the enabling transistor TE2 is turned on by the logic HIGH of the enabling signals enb. That is, the first node no1 is at logic HIGH, and the second node no2 is at logic LOW, when the enable signal E is at logic LOW. On the other hand, if the enable signal E is at logic HIGH, the enabling transistor TE1 is turned on by the logic HIGH of the enabling signals enbb, and the enabling transistor TE2 is turned off by the logic LOW of the enabling signals enb. That is, the first node no1 is at logic LOW, and the second node no2 is at logic HIGH, when the enable signal E is at logic HIGH. Furthermore, when the clock signal CP is at logic LOW, in addition to the operation that the second node signal at the second node no2 changes with the enable signal E, the latch output signal L-EN at the output 189 of the coupling circuit 180 follows the second node signal, because the coupling transistor TC3 is at the non-conducting state when the clock signal CP is at logic LOW. Consequently, the logic value of the latch output signal L-EN follows the logic value of the enable signal E during the time period when the clock signal CP is at logic LOW.

When the clock signal CP is at logic HIGH, the logic LOW of the clock signal clkb at the gate terminal of the clocking transistor TK3 drives the clocking transistor TK3 into the non-conducting state, and the logic HIGH of the clock signal clkbb at the gate terminal of the coupling transistor TC3 drives the coupling transistor TC3 into the conducting state. If the clocking transistor TK3 is in the non-conducting state, the first node signal at the first node no1 and the second node signal at the second node no2 do not change with the enable signal E, because the branch-one transistor TA1 and the branch-two transistor TB1 are interconnected as a cross latching circuit. Additionally, if the coupling transistor TC3 is in the conducting state, the latch output signal L-EN at the output 189 of the coupling circuit 180 is latched to a logic value that is the same as the logic value of the second node signal (at the second node no2) at the time that the clock signal CP changes from logic LOW to logic HIGH. Here, before the clock signal CP changes from logic LOW to logic HIGH, the logic value of the second node signal follows the logic value of the enable signal E. Consequently, the latch output signal L-EN is latched during the time period when the clock signal CP is at logic HIGH, and the latched logic value of the latch output signal L-EN is determined by the logic value of the enable signal E at the rising edge of the clock signal CP.

Figure 2:
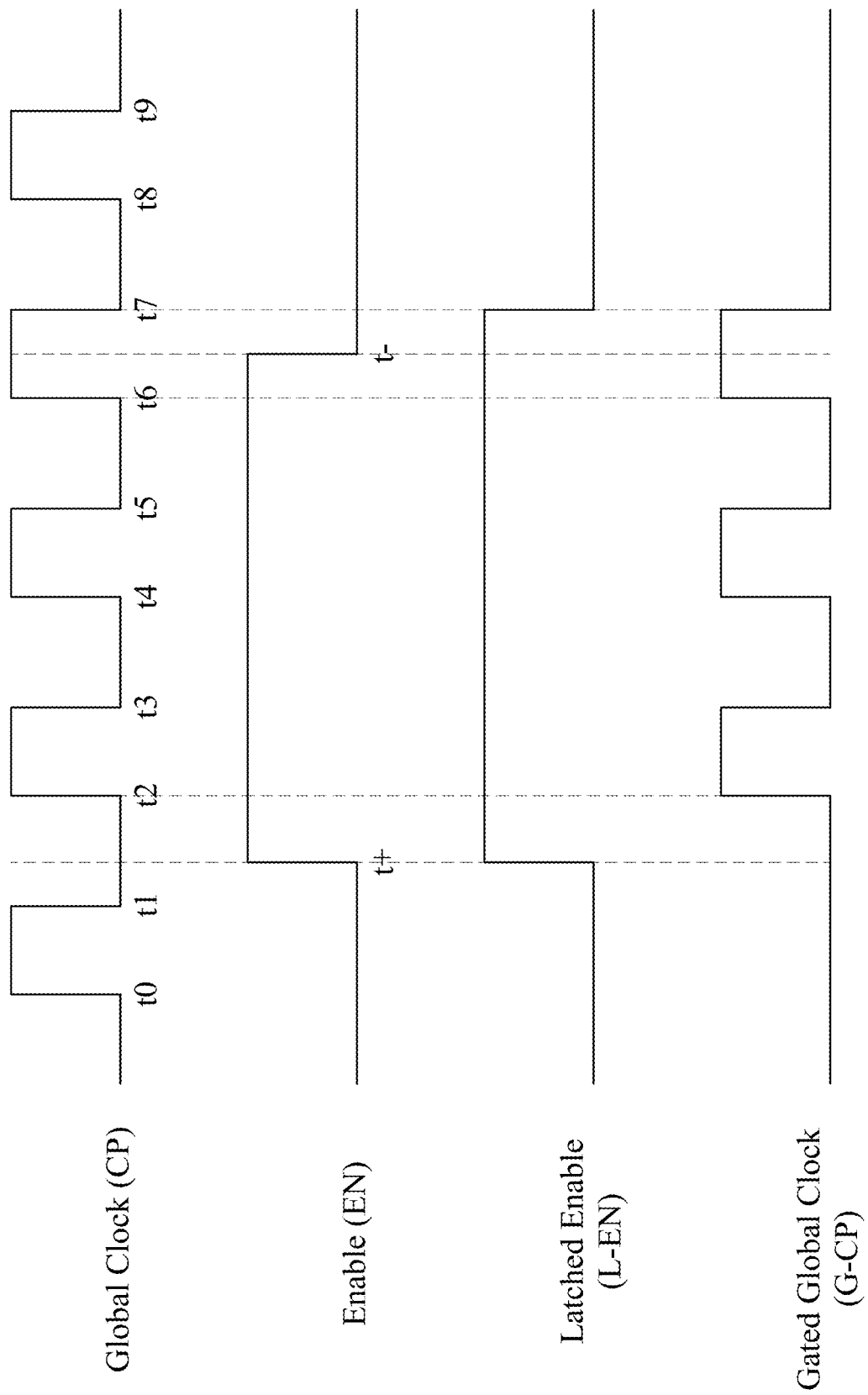
FIG. 2 are waveforms of signals at various terminals in the integrated circuit of FIG. 1, in accordance with some embodiments.

In the following, the operation of the integrated circuit of FIG. 1 is explained with reference to the waveforms in FIG. 2. FIG. 2 is a diagram of waveforms of the clock signal CP, the enable signal E, the latch output signal L-EN, and the gated clock signal G-CP, in accordance with some embodiments. In some embodiments, such as in the example waveforms of FIG. 2, the clock signal CP is a global clock signal, and the gated clock signal G-CP is a gated global clock signal.

FIG. 2 includes example waveforms generated by the integrated circuit of FIG. 1 in which the enabling latch circuit 100 is latched by the rising edge of the clock signal CP. The latched logic value of the latch output signal L-EN at the output 109 of the enabling latch circuit 100 depends upon the logic value of the enable signal E at the rising edge of the clock signal CP. In FIG. 2, the enable signal E is at logic HIGH from time t+ to time t−. In FIG. 2, each of time t0, time t2, time t4, time t6, and time t8 corresponds to a rising edge of the clock signal CP. Each of time t1, time t3, time t5, time t7, and time t9 corresponds to a falling edge of the clock signal CP. When the clock signal CP is at logic HIGH from time t0 to time t1, the logic value of the latch output signal L-EN is latched to logic LOW, because the enable signal E at time t0 (as a rising edge is of the clock signal CP) is at logic LOW. When the clock signal CP is at logic LOW from time t1 to time t2, the logic value of the latch output signal L-EN follows the enable signal E from time t1 to time t2. That is, the logic value of the latch output signal L-EN is at logic LOW from time t1 to time t+, and the logic value of the latch output signal L-EN is at logic HIGH from time t+ to time t2. The logic value of the latch output signal L-EN is latched to logic HIGH from time t2 to time t3 when the clock signal CP is at logic HIGH. The logic value of the latch output signal L-EN is at logic HIGH from time t3 to time t4, as the latch output signal L-EN follows the enable signal E from time t3 to time t4 when the clock signal CP is at logic LOW. From time t4 to time t5, the logic value of the latch output signal L-EN is latched to logic HIGH, when the clock signal CP is at logic HIGH. From time t5 to time t6, the logic value of the latch output signal L-EN is at logic HIGH, as the latch output signal L-EN follows the enable signal E when the clock signal CP is at logic LOW. From time t6 to time t7, the logic value of the latch output signal L-EN is latched to logic HIGH, when the clock signal CP is at logic HIGH.

When the latch output signal L-EN is received at the first input terminal 191 of the clock gating circuit 190 and the clock signal CP is received at the second input terminal 192 of the clock gating circuit 190, as shown in FIG. 1, the clock gating circuit 190 is gated with the latch output signal L-EN. In FIG. 2, the clock signal CP during the time window from time t+ to t7 (when the latch output signal L-EN is at logic HIGH) is transmitted to the output terminal 199 of the clock gating circuit 190 as the gated clock signal G-CP. The logic values of the gated clock signal G-CP during the time periods from time t0 to time t+ and from time t7 to time t9 (when the latch output signal L-EN is at logic LOW) are kept at logic LOW.

In FIG. 2, even though the enable signal E is changed from logic HIGH to logic LOW at time t− and is further kept at logic LOW from time t− to time t7, the latch output signal L-EN does not follow the enable signal E to become logic LOW from time t− to time t7, as the latch output signal L-EN is latched until time t7. The latching of the latch output signal L-EN until the next falling edge (e.g., time t7) of the clock signal CP allows the gated clock signal G-CP to maintain the same duty cycle as the original clock signal CP. The latching of the latch output signal L-EN until the next falling edge of the clock signal CP ensures positive pulses of the clock signal CP pass through the enabling latch circuit 100 as complete pulses. As a comparison, in some alternative designs, if the enable signal E is directly coupled to the first input terminal 191 of the clock gating circuit 190, the last positive pulse will be truncated by the falling edge of the enable signal E. For example, with the alternative designs, if the clock signal CP in FIG. 2 is gated directly with the enable signal E, a first portion of the last positive pulse from time t6 to t− will pass through the clock gating circuit as a narrowed positive pulse with logic HIGH, but a second portion of the last positive pulse from time t− to t7 will be set to logic LOW by the clock gating circuit. As the relative time difference between the falling edge (e.g., t−) of the enable signal E and the rising edge (e.g., t6) of the last positive pulse may change, the pulse width (which is the difference between t– and t6) of the last positive pulse in the gated clock signal G-CP may change accordingly as well. With the alternative designs, if the gated clock signal G-CP is used as the clock for synchronizing and controlling a synchronous logic circuit, the pulse width variations may introduce uncertainties in the operation of a synchronous logic circuit and reduce the operation reliability. In the present disclosure, using the latch output signal L-EN to generate the gated clock signal G-CP removes the pulse width variations, which eliminates the reliability concerns due to pulse width variations in a gated clock signal G-CP.

Furthermore, two transistors in the enabling latch circuit 100 of FIG. 1 have the gate terminals configured to receive clock signals from the clock logic circuit 60. The gate terminal of the clocking transistor TK3 receives the clock signal clkb from the output of the first inverter 62 in the clock logic circuit 60, and the gate terminal of the third coupling transistor TC3 receives the clock signal clkbb from the output of the second inverter 64 in the clock logic circuit 60. In FIG. 1, the gate terminals of two transistors in the enabling latch circuit 100 need to be driven by the clock logic circuit 60. In contrast, in some alternative designs, the gate terminals of four transistors in the enabling latch circuit need to be driven by a clock logic circuit, and the four transistors are clock coupling transistors. Reducing the number of transistors that need to be driven by the clock logic circuit 60 improves the response time of the enabling latch circuit 100 and also reduces power consumption (if many enabling latch circuits are used in an integrated circuit). In some embodiments, the number of transistors that need to be driven by the clock logic circuit 60 are further reduced. For example, in the enabling latch circuit 300A of FIG. 3A, only one transistor has the gate terminal configured to receive a clock signal from the clock logic circuit 60.

Figure 3A:
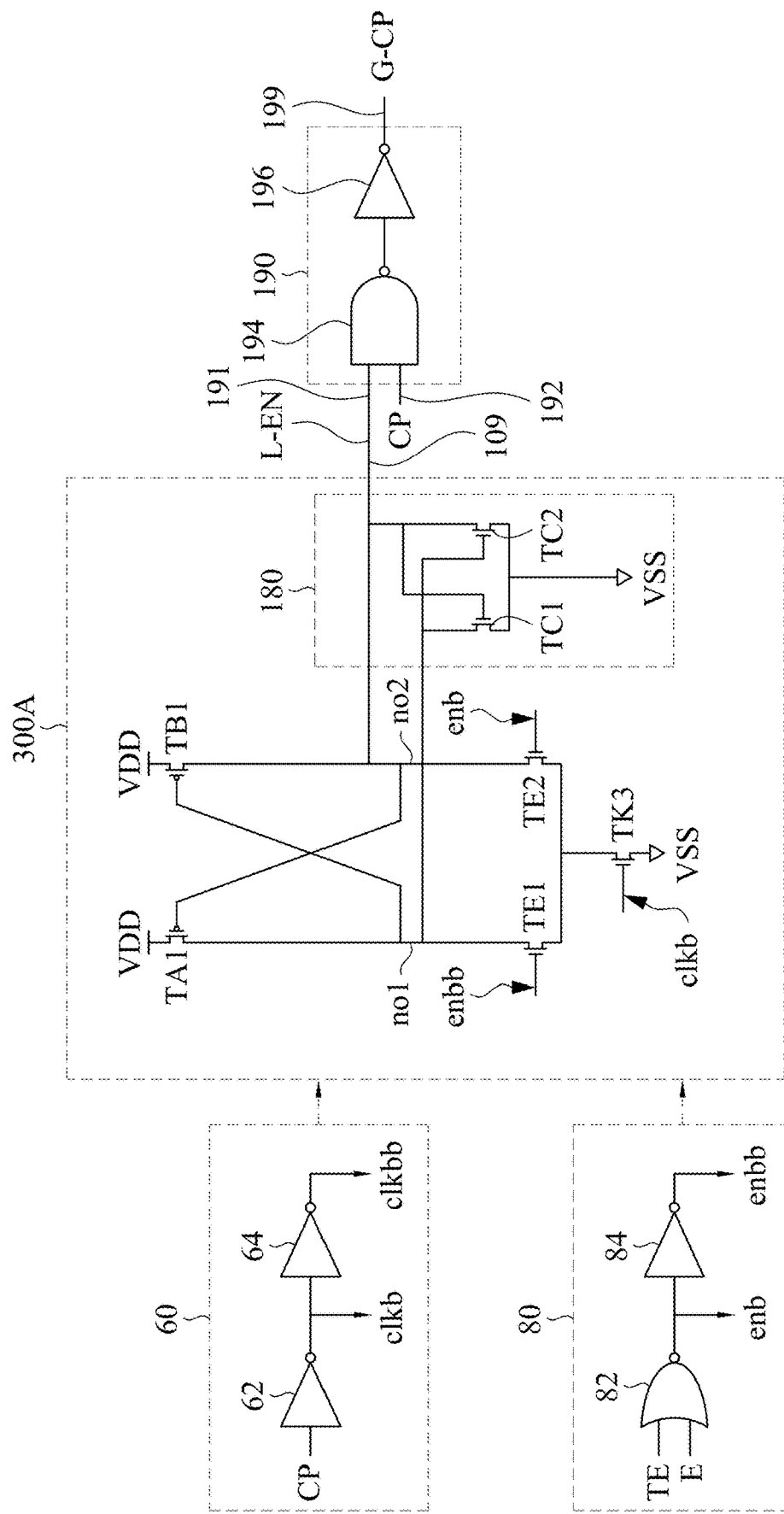
FIGS. 3A-3C are circuit diagrams of integrated circuits having enabling latch circuits configured to generate a latch output signal, in accordance with some embodiments.

FIG. 3A is a circuit diagram of an integrated circuit having an enabling latch circuit 300A configured to generate a latch output signal L-EN, in accordance with some embodiments. The enabling latch circuit 300A in FIG. 3A is a modification of the enabling latch circuit 100 in FIG. 1. The modification includes removing the third coupling transistor TC3 in the enabling latch circuit 100 of FIG. 1 to form the enabling latch circuit 300A of FIG. 3A. The modification also includes, in FIG. 3A, connecting both the source terminal of the first coupling transistor TC1 and the source terminal of the second coupling transistor TC2 to the power supply VSS.

In FIG. 3A, when the source terminal of the first coupling transistor TC1 and the source terminal of the second coupling transistor TC2 are maintained at the power supply VSS, the first coupling transistor TC1 and the second coupling transistor TC2 in the coupling circuit 180 form a local latch circuit. The logic level at the output 189 of the local latch circuit is controlled by the first node signal at the first node no1 and the second node signal at the second node no2. If the first node no1 is at logic LOW and the second node no2 is at logic HIGH during a set process, the output 189 of the local latch circuit is set to logic HIGH. Alternatively, if the first node no1 is at logic HIGH and the second node no2 is at logic LOW during a reset process, the output 189 of the local latch circuit is reset to logic LOW. That is, the logic level at the output 189 follows the logic level at the second node no2 during the set process or the reset process.

In FIG. 3A, if the clocking transistor TK3 is turned on by the clock signal clkb, the first node signal at the first node no1 and the second node signal at the second node no2 are determined by the enabling signal enbb applied to the gate terminal of the enabling transistor TE1 and the enabling signal enb applied to the gate terminal of the enabling transistor TE2. Consequently, if the clocking transistor TK3 is tuned on by the clock signal clkb, the latch output signal L-EN at the output 109 of the enabling latch circuit 300A follows the enable signal E, and the logic level of the latch output signal L-EN reaches towards a same logic level as the enable signal E, when the enable signal TE is maintained at logic LOW.

In FIG. 3A, if the clocking transistor TK3 is turned off by the clock signal clkb, the first node signal at the first node no1 and the second node signal at the second node no2 are not influenced by the enabling signal enbb applied to the gate terminal of the enabling transistor TE1 and the enabling signal enb applied to the gate terminal of the enabling transistor TE2. The logic level at the output 189 is latched to the logic level at the second node no2 at the time that the clocking transistor TK3 is changed from the conducting state to the non-conducting state at a falling edge of the clock signal clkb. Consequently, the logic level of the latch output signal L-EN at the output 109 of the enabling latch circuit 300A is latched to a logic level which is the logic level of the latch output signal L-EN at the time that the clocking transistor TK3 is turning off at the rising edge of the clock signal CP.

Figure 3B:
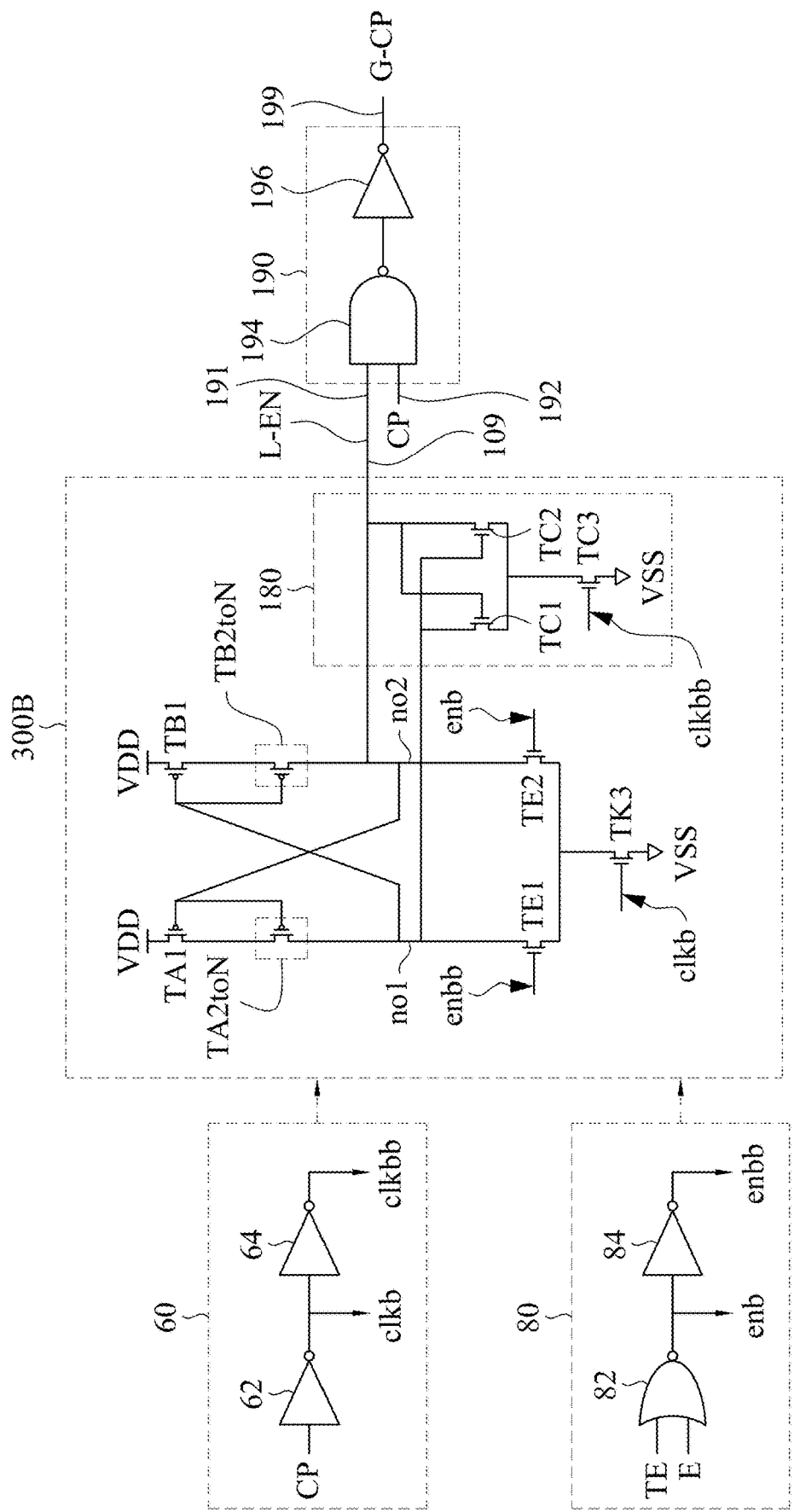
Figure 3C:
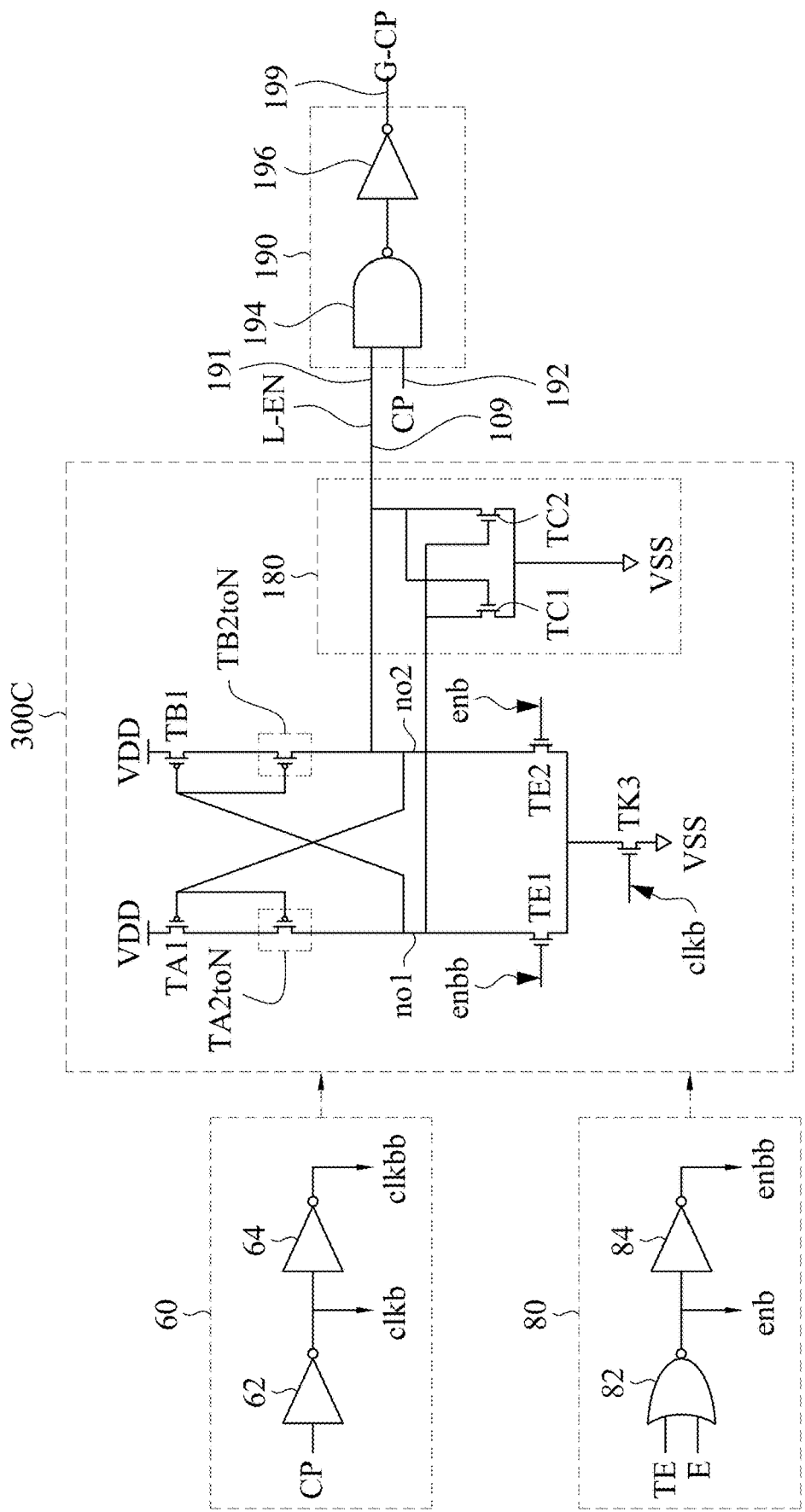

In some embodiments, the branch-one transistor TA1 and the branch-two transistor TB1 in the enabling latch circuit 100 of FIG. 1 are replaced correspondingly with at least two the branch-one transistors and at least two the branch-two transistors. FIG. 3B is a circuit diagram of an integrated circuit having an enabling latch circuit 300B, in accordance with some embodiments. The enabling latch circuit 300B is a modification of the enabling latch circuit 100 of FIG. 1. In some embodiments, the branch-one transistor TA1 and the branch-two transistor TB1 in the enabling latch circuit 300A of FIG. 3A are replaced correspondingly with at least two of the branch-one transistors and at least two of the branch-two transistors. FIG. 3C is a circuit diagram of an integrated circuit having an enabling latch circuit 300C, in accordance with some embodiments. The enabling latch circuit 300C is a modification of the enabling latch circuit 300A of FIG. 3A.

In FIG. 3B, the enabling latch circuit 300B includes at least two branch-one transistors (labeled with symbols TA1 and TA2toN) and at least two branch-two transistor (labeled with symbols TB1 and TB2toN). In FIG. 3C, the enabling latch circuit 300C also includes at least two branch-one transistors (labeled with symbols TA1 and TA2toN) and at least two branch-two transistors (labeled with symbols TB1 and TB2toN). In FIG. 3B and FIG. 3C, if the number of the branch-one transistors is N (which is a positive integer larger than or equal to 2), then the symbol TA2toN represents all of the N–1 branch-one transistors (from the second branch-one transistor to $N^{th}$ branch-one transistor) having semiconductor channels electrically connected in series between the drain of the first branch-one transistor TA1 and the first node no1. The gate terminals of all branch-one transistors are electrically connected together. Similarly, if the number of the branch-two transistors is N, then the symbol TB2toN represents all of the N–1 branch-two transistors (from the second branch-two transistor to $N^{th}$ branch-two transistor) having semiconductor channels electrically connected in series between the drain of the first branch-two transistor TB1 and the second node no2. The gate terminals of all branch-two transistors are electrically connected together.

In FIG. 3B and FIG. 3C, the gate terminals of all branch-one transistors (TA1 and TA2toN) are electrically connected to the second node no2, while the gate terminals of all branch-two transistors (TB1 and TB2toN) are electrically connected to the first node no1. Latching connections are formed by the cross coupling between the branch-one transistors and the branch-two transistors. Because the semiconductor channels of all branch-one transistors (TA1 and TA2toN) are serially connected and the semiconductor channels of all branch-two transistors (TB1 and TB2toN) are serially connected, the cross coupling between the branch-one transistors and the branch-two transistors in FIG. 3B is weaker than the cross coupling between the branch-one transistor TA1 and the branch-two transistor TB1 in FIG. 1. For the same reason, the cross coupling between branch-one transistors and the branch-two transistors in FIG. 3C is weaker than the cross coupling between the branch-one transistor TA1 and the branch-two transistor TB1 in FIG. 3A. Consequently, when the clocking transistor TK3 is at the conducting state, the first node signal at the first node no1 and the second node signal at the second node no2 in the enabling latch circuits 300B or 300C are more responsive to changes of the enable signal E, as compared with the first node signal and the second node signal correspondingly in the enabling latch circuits 100 or 300A.

In FIG. 1 and FIGS. 3A-3C, in some embodiments, each of the enabling transistor TE1, the enabling transistor TE2, and the clocking transistor TK3 has a driving strength that is enhanced by enlarge the channel width of the corresponding transistor. In some embodiments, each of the enabling transistor TE1, the enabling transistor TE2, and the clocking transistor TK3 has a channel width that is larger than the channel width of the branch-one transistor TA1, the branch-two transistor TB1, the coupling transistor TC1, or the coupling transistor TC2. In some embodiments, each of the branch-one transistor TA1, the branch-two transistor TB1, the coupling transistor TC1, or the coupling transistor TC2 has a default channel width, and the default channel width is the channel width of majority transistors in an integrated circuit having the clock logic circuit 60, the enabling logic circuit 80, and the clock gating circuit 190. When the driving strengths of the enabling transistor TE1, the enabling transistor TE2, and the clocking transistor TK3 are enchanted, the first node signal at the first node no1 and the second node signal at the second node no2 in the enabling latch circuit become more responsive to changes of the enable signal E when the clocking transistor TK3 is at the conducting state.

In FIG. 1 and FIGS. 3A-3C, in some embodiments, each of the enabling transistor TE1, the enabling transistor TE2, and the clocking transistor TK3 has a threshold voltage that is reduced from a default threshold voltage, while each of the branch-one transistor TA1, the branch-two transistor TB1, the coupling transistor TC1, and the coupling transistor TC2 has the default threshold voltage. The default threshold voltage is the threshold voltage of majority transistors in an integrated circuit having the clock logic circuit 60, the enabling logic circuit 80, and the clock gating circuit 190. Alternatively, each of the branch-one transistor TA1, the branch-two transistor TB1, the coupling transistor TC1, and the coupling transistor TC2 has threshold voltage that is increased from the default threshold voltage, while each of the enabling transistor TE1, the enabling transistor TE2, and the clocking transistor TK3 has the default threshold voltage. When the threshold voltage in each of the branch-one transistor TA1, the branch-two transistor TB1, the coupling transistor TC1, and the coupling transistor TC2 is increased, the latching connection formed by the branch-one transistor TA1 and the branch-two transistor TB1 becomes more robust, and the latching connection formed by the coupling transistor TC1, and the coupling transistor TC2 becomes more robust as well.

Figure 4:
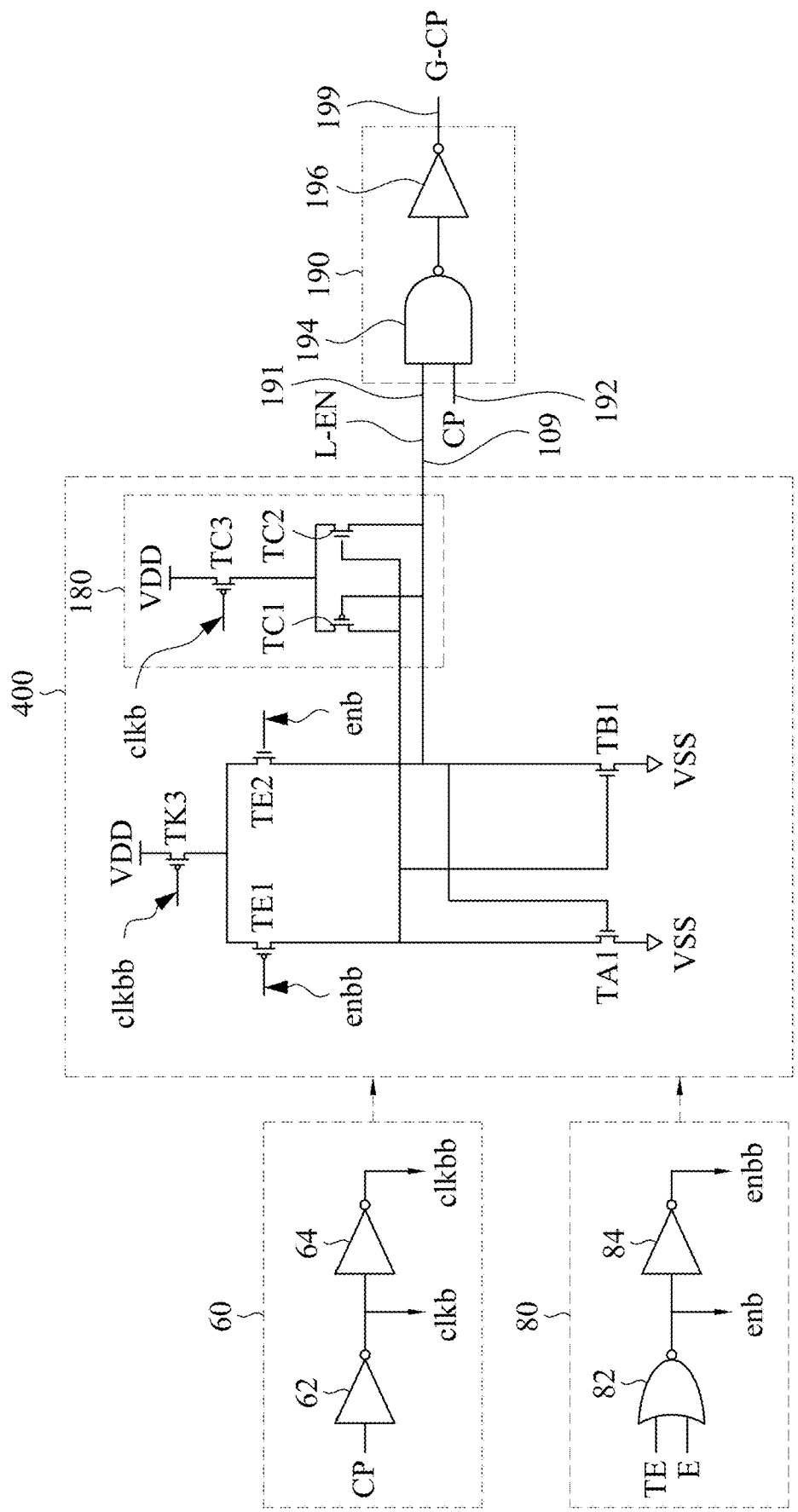
FIG. 4 is a circuit diagram of an integrated circuit having an enabling latch circuit configured to generate a latch output signal, in accordance with some embodiments.

In the enabling latch circuits 100, 300A, 300B, and 300C, each of the clocking transistor TK3, the first enabling transistor TE1, the second enabling transistor TE2, the coupling transistor TC1, and the coupling transistor TC2 is a first-type transistor, whereas each of the branch-one transistor TA1 and the branch-two transistor TB1 is a second-type transistor. In the embodiments as shown in FIG. 1 and FIGS. 3A-3C, the first-type transistor is an NMOS transistor, while the second-type transistor is a PMOS transistor. In alternative embodiments, such as in the embodiments as shown in FIG. 4 and FIGS. 5A-5C, the first-type transistor is a PMOS transistor, while the second-type transistor is an NMOS. transistor FIG. 4 is a circuit diagram of an integrated circuit having an enabling latch circuit 400 configured to generate a latch output signal L-EN, in accordance with some embodiments. The enabling latch circuit 400 in FIG. 4 is a modification of the enabling latch circuit 100 in FIG. 1. The coupling transistors TC1, TC2, and TC3, the enabling transistors TE1 and TE2, and the clocking transistor TK3 in the enabling latch circuit 400 of FIG. 4 are PMOS transistors, whereas the corresponding transistors in FIG. 1 are NMOS transistors. Additionally, the branch-one transistor TA1 and the branch-two transistor TB1 in the enabling latch circuit 400 of FIG. 4 are NMOS transistors, whereas the corresponding transistors in FIG. 1 are PMOS transistors. Furthermore, the gate terminal of the clocking transistor TK3 in FIG. 4 receives the clock signal clkbb from the output of the second inverter 64 in the clock logic circuit 60, and the gate terminal of the coupling transistor TC3 in FIG. 4 receives the clock signal clkb from the output of the first inverter 62. In contrast, the gate terminal of the clocking transistor TK3 in FIG. 1 receives the clock signal clkb from the output of the first inverter 62, and the gate terminal of the coupling transistor TC3 in FIG. 1 receives the clock signal clkbb from the output of the second inverter 64.

Figure 5A:
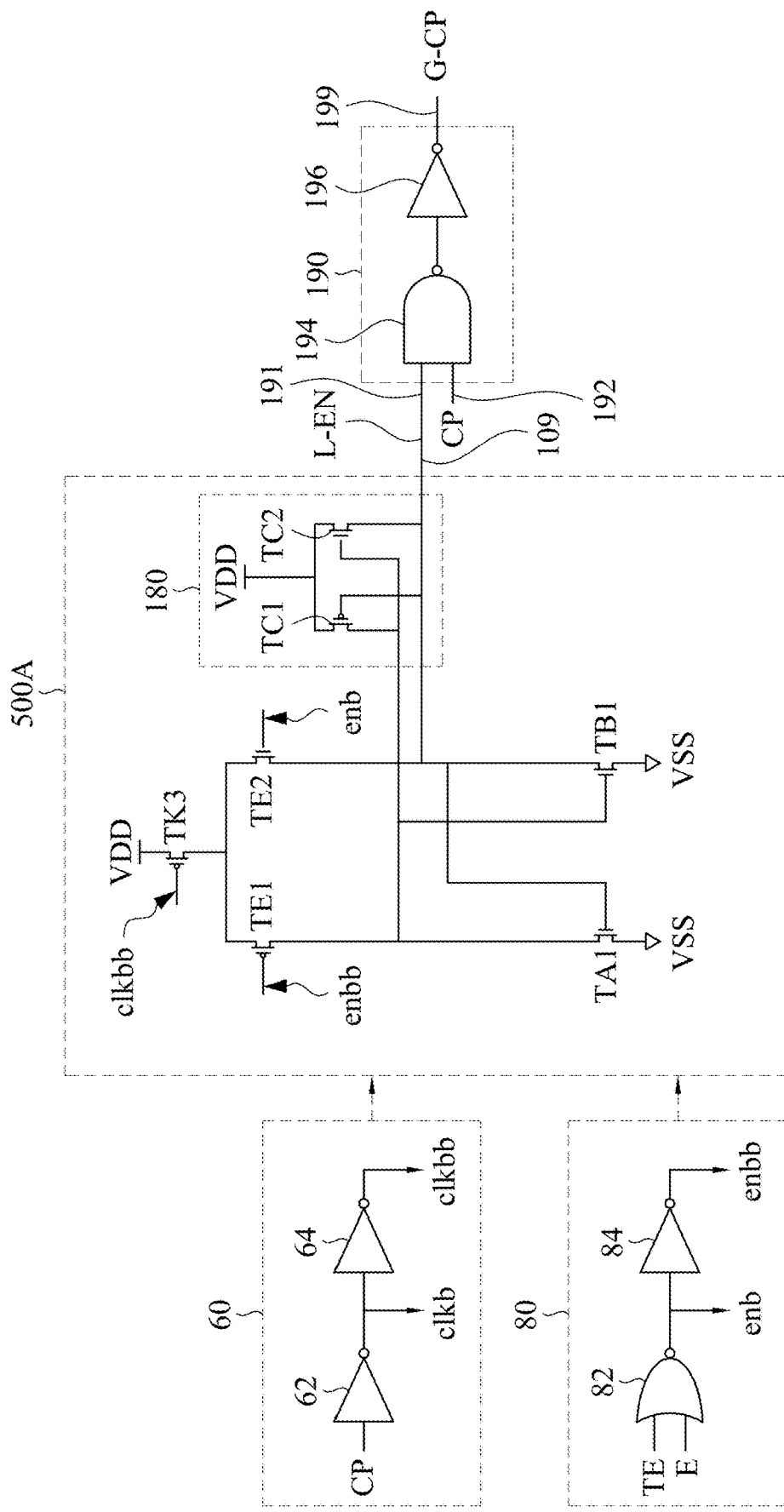
FIGS. 5A-5C are circuit diagrams of integrated circuits having enabling latch circuits configured to generate a latch output signal, in accordance with some embodiments.

FIG. 5A is a circuit diagram of an integrated circuit having an enabling latch circuit 500A configured to generate a latch output signal, in accordance with some embodiments. The enabling latch circuit 500A in FIG. 5A is a modification of the enabling latch circuit 300A in FIG. 3A. The coupling transistors TC1 and TC2, the enabling transistors TE1 and TE2, and the clocking transistor TK3 in the enabling latch circuit 500A of FIG. 5A are PMOS transistors, whereas the corresponding transistors in FIG. 3A are NMOS transistors. Additionally, the branch-one transistor TA1 and the branch-two transistor TB1 in the enabling latch circuit 500A of FIG. 5A are NMOS transistors, whereas the corresponding transistors in FIG. 3A are PMOS transistors. Furthermore, the gate terminal of the clocking transistor TK3 in FIG. 5A receives the clock signal clkbb from the output of the second inverter 64 in the clock logic circuit 60, whereas the gate terminal of the clocking transistor TK3 in FIG. 3A receives the clock signal clkb from the output of the first inverter 62.

Figure 5B:
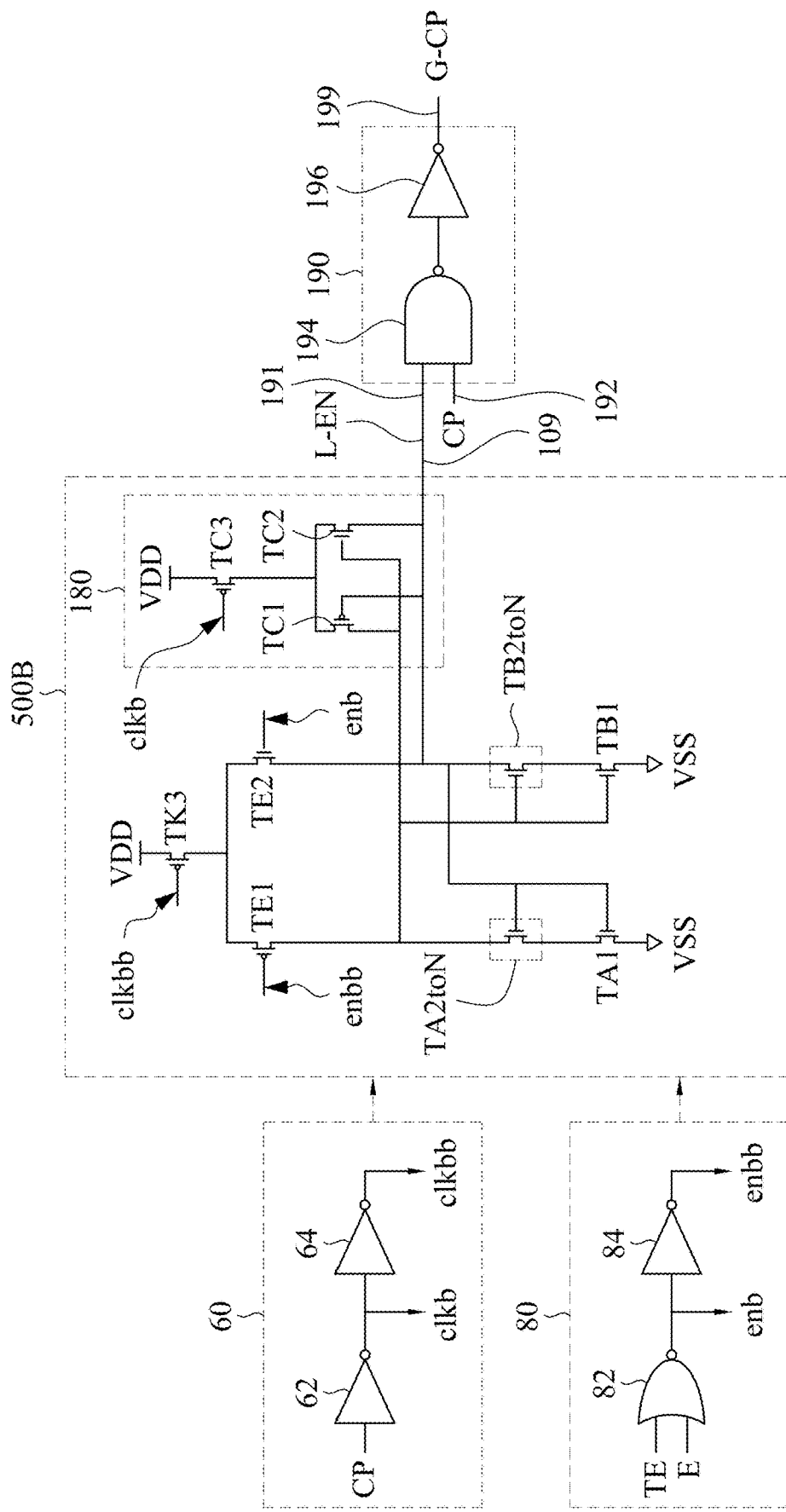

FIG. 5B is a circuit diagram of an integrated circuit having an enabling latch circuit 500B configured to generate a latch output signal L-EN, in accordance with some embodiments. The enabling latch circuit 500B in FIG. 5B is a modification of the enabling latch circuit 300B in FIG. 3B. The coupling transistors TC1, TC2, and TC3, the enabling transistors TE1 and TE2, and the clocking transistor TK3 in the enabling latch circuit 500B of FIG. 5B are PMOS transistors, whereas the corresponding transistors in FIG. 3B are NMOS transistors. Additionally, the branch-one transistor TA1 and TA2toN, and the branch-two transistor TB1 and TB2toN in the enabling latch circuit 500B of FIG. 5B are NMOS transistors, whereas the corresponding transistors in FIG. 3B are PMOS transistors. Furthermore, the gate terminal of the clocking transistor TK3 in FIG. 5B receives the clock signal clkbb from the output of the second inverter 64 in the clock logic circuit 60, and the gate terminal of the coupling transistor TC3 in FIG. 5B receives the clock signal clkb from the output of the first inverter 62. In contrast, the gate terminal of the clocking transistor TK3 in FIG. 3B receives the clock signal clkb from the output of the first inverter 62, and the gate terminal of the coupling transistor TC3 in FIG. 3B receives the clock signal clkbb from the output of the second inverter 64.

Figure 5C:
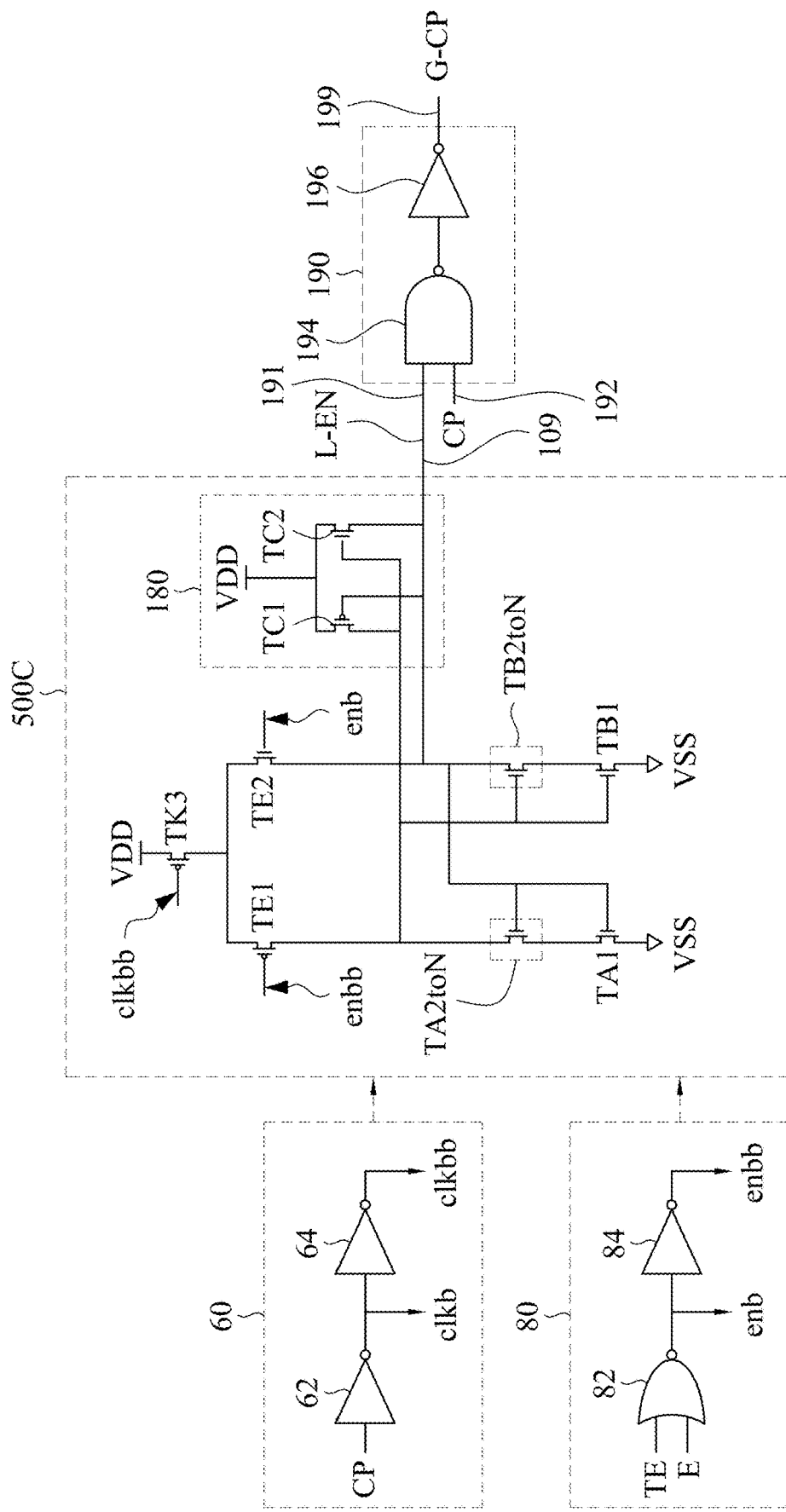

FIG. 5C is a circuit diagram of an integrated circuit having an enabling latch circuit 500C configured to generate a latch output signal L-EN, in accordance with some embodiments. The enabling latch circuit 500C in FIG. 5C is a modification of the enabling latch circuit 300C in FIG. 3C. The coupling transistors TC1 and TC2, the enabling transistors TE1 and TE2, and the clocking transistor TK3 in the enabling latch circuit 500C of FIG. 5C are PMOS transistors, whereas the corresponding transistors in FIG. 3C are NMOS transistors. Additionally, the branch-one transistor TA1 and TA2toN, and the branch-two transistor TB1 and TB2toN in the enabling latch circuit 500C of FIG. 5C are NMOS transistors, whereas the corresponding transistors in FIG. 3C are PMOS transistors. Furthermore, the gate terminal of the clocking transistor TK3 in FIG. 5C receives the clock signal clkbb from the output of the second inverter 64 in the clock logic circuit 60, whereas the gate terminal of the clocking transistor TK3 in FIG. 3C receives the clock signal clkb from the output of the first inverter 62.

Similar to the enabling latch circuits 100 in FIGS. 1 and 300A-300C in FIGS. 3A-3C, the enabling latch circuit 400 in FIGS. 4 and 500A-500C in FIGS. 5A-5C are also triggered by the rising edge of the clock signal CP. In FIG. 4 and FIGS. 5A-5C, at the rising edge of the clock signal CP, the clock signal clkbb changes from logic LOW to logic HIGH and turns off the clocking transistor TK3, which causes the latch output signal L-EN to be latched by the enabling latch circuit 400, 500A, 500B, or 500C.

In FIG. 1, FIGS. 3A-3C, FIG. 4, and FIGS. 5A-5C, each of the enabling latch circuits 100, 300A-300C, 400, and 500A-500C is used to generate a latch output signal L-EN by latching the enable signal E at a rising edge of the clock signal CP, and the latch output signal L-EN is further used to gate the clock signal CP to generate a gated clock signal G-CP. In alternative embodiments as described next in FIG. 6, FIGS. 8A-8C, FIG. 9, and FIGS. 10A-10C, each of the enabling latch circuits 100, 300A-300C, 400, and 500A-500C is used to generate a latch output signal L-EN by latching the enable signal E at a falling edge of a clock signal CPN, and the latch output signal L-EN is further used to gate the clock signal CPN to generate a gated clock signal G-CPN. In some embodiments, the phase of the clock signal CPN is different from the phase of the clock signal CP by 180 degrees. In some embodiments, when the clock signal CPN is at logic HIGH, the clock signal CP is at logic LOW, and conversely, when the clock signal CPN is at logic LOW, the clock signal CP is at logic HIGH.

Figure 6:
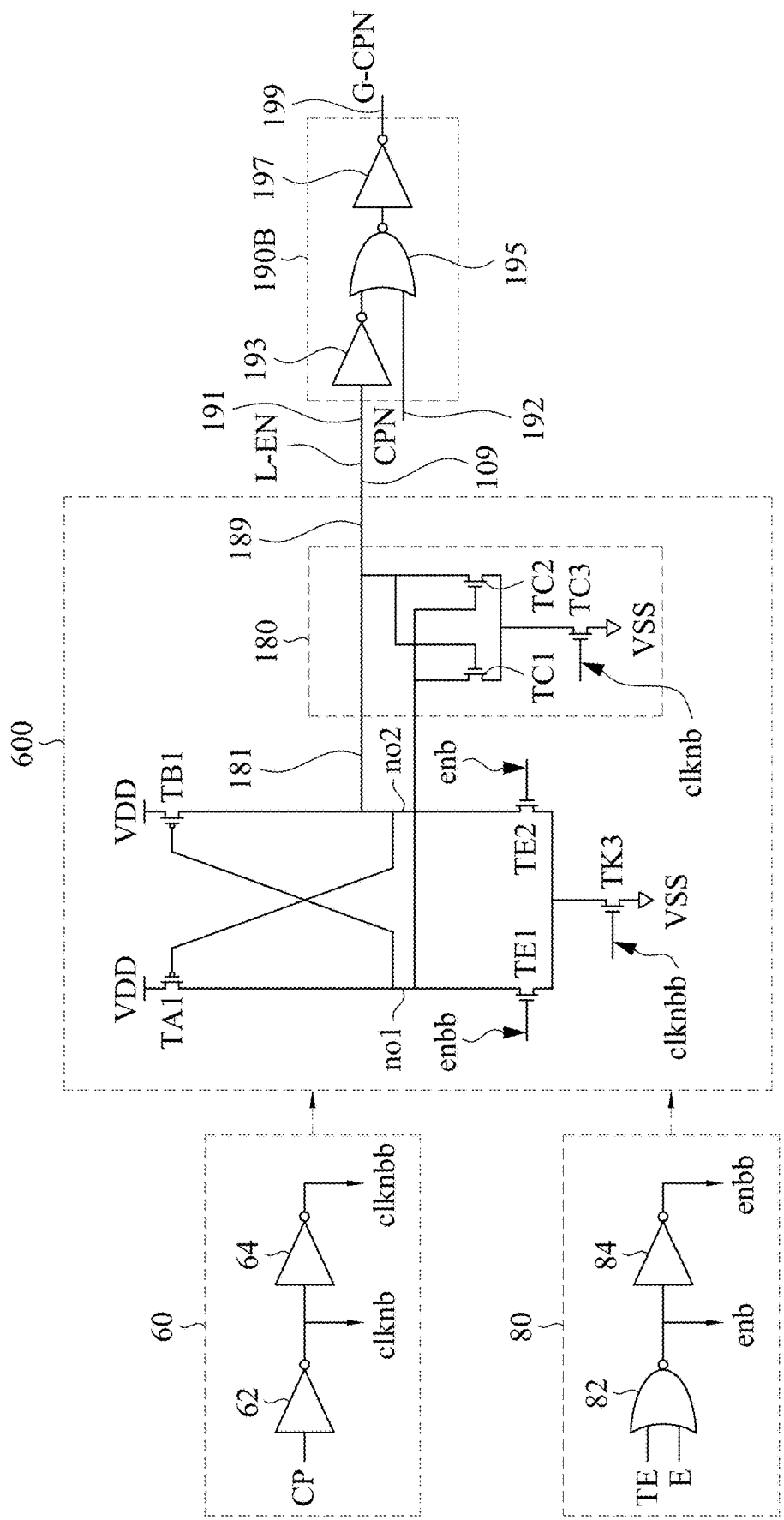
FIG. 6 is a circuit diagram of an integrated circuit having an enabling latch circuit configured to generate a latch output signal, in accordance with some embodiments.

FIG. 6 is a circuit diagram of an integrated circuit having an enabling latch circuit 600 which is used to gate the clock signal CPN to generate a gated clock signal G-CPN, in accordance with some embodiments. The integrated circuit in FIG. 6 is a modification of the integrated circuit in FIG. 1. The input of the first inverter 62 of the clock logic circuit 60 in FIG. 6 receives a clock signal CPN, whereas the input of the first inverter 62 of the clock logic circuit 60 in FIG. 1 receives a clock signal CP. The gate terminal of the clocking transistor TK3 in FIG. 6 receives the clock signal clknbb from the output of the second inverter 64, whereas the gate terminal of the clocking transistor TK3 in FIG. 1 receives the clock signal clkb from the output of the first inverter 62. The latch output signal L-EN at the output 109 of the enabling latch circuit 600 in FIG. 6 is coupled to the clock gating circuit 190B for gating the clock signal CPN, whereas the latch output signal L-EN at the output 109 of the enabling latch circuit 100 in FIG. 1 is coupled to the clock gating circuit 190 for gating the clock signal CP.

As shown in FIG. 6, in some embodiments, the clock gating circuit 190B for gating the clock signal CPN includes an inverter 193, an NOR gate 195, and an inverter 197. The inverter 193 has an input configured to receive the latch output signal L-EN from the output 109 of the enabling latch circuit 600. The output of the inverter 193 is electrically connected to the first input of the NOR gate 195. The second input of the NOR gate 195 is configured to receive the clock signal CPN. The output of the NOR gate 195 is electrically connected to the input of the inverter 197. The output of the inverter 197 is configured to generate the gated clock signal G-CPN.

Figure 7:
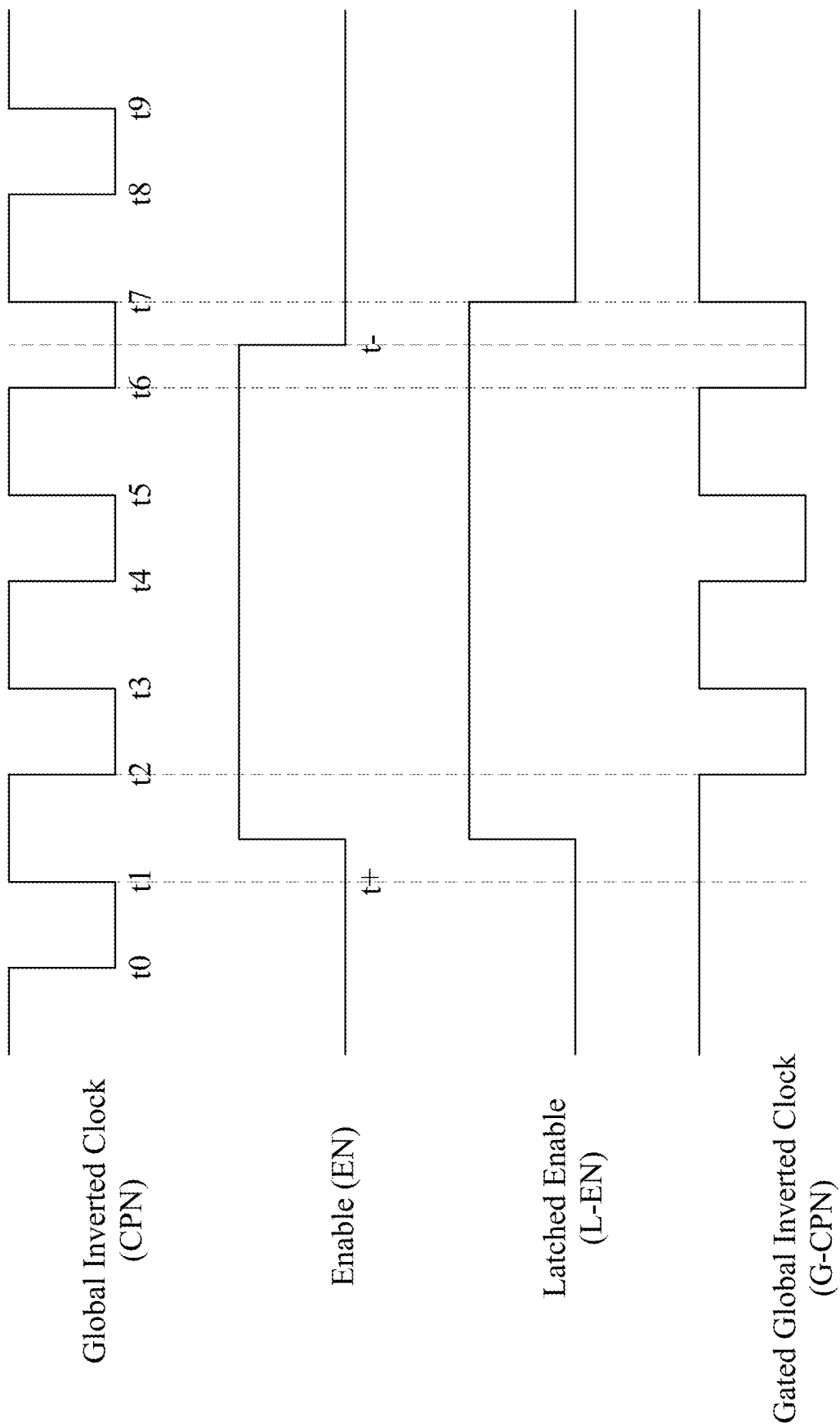
FIG. 7 are waveforms of signals at various terminals in the integrated circuit of FIG. 6, in accordance with some embodiments.

In the following, the operation of the integrated circuit of FIG. 6 is explained with reference to the waveforms in FIG. 7. FIG. 7 is a diagram of waveforms of the inverted clock signal CPN, the enable signal E, the latch output signal L-EN, and the gated inverted clock signal G-CPN, in accordance with some embodiments. In some embodiments, such as in the example waveforms of FIG. 7, the clock signal CPN is a global inverted clock signal, and the gated clock signal G-CPN is a gated global inverted clock signal.

FIG. 7 includes example waveforms generated by the integrated circuit of FIG. 6 in which the enabling latch circuit 600 is latched by the falling edges of the clock signal CPN. The latched logic value of the latch output signal L-EN at the output 109 of the enabling latch circuit 600 depends upon the logic value of the enable signal E at the falling edge of the clock signal CPN. The enable signal E is at logic HIGH from time t+ to time t−. In FIG. 7, each of time t0, time t2, time t4, time t6, and time t8 corresponds to a falling edge of the clock signal CPN. Each of time t1, time t3, time t5, time t7, and time t9 corresponds to a rising edge of the clock signal CPN. When the clock signal CPN is at logic LOW from time t0 to time t1, the logic value of the latch output signal L-EN is latched to logic LOW, because the enable signal E at time t0 (as a falling edge of the clock signal CPN) is at logic LOW. When the clock signal CPN is at logic HIGH from time t1 to time t2, the logic value of the latch output signal L-EN follows the enable signal E from time t1 to time t2. That is, the logic value of the latch output signal L-EN is at logic LOW from time t1 to time t+, and the logic value of the latch output signal L-EN is at logic HIGH from time t+ to time t2. The logic value of the latch output signal L-EN is latched to logic HIGH from time t2 to time t3 when the clock signal CPN is at logic LOW. The logic value of the latch output signal L-EN is at logic HIGH from time t3 to time t4, as the latch output signal L-EN follows the enable signal E from time t3 to time t4 when the clock signal CPN is at logic HIGH. From time t4 to time t5, the logic value of the latch output signal L-EN is latched to logic HIGH, when the clock signal CPN is at logic LOW. From time t5 to time t6, the logic value of the latch output signal L-EN is at logic HIGH, as the latch output signal L-EN follows the enable signal E when the clock signal CPN is at logic HIGH. From time t6 to time t7, the logic value of the latch output signal L-EN is latched to logic HIGH, when the clock signal CPN is at logic LOW.

When the latch output signal L-EN is received at the first input terminal 191 of the clock gating circuit 190B and the clock signal CPN is received at the second input terminal 192 of the clock gating circuit 190B, as shown in FIG. 6, the clock signal G-CPN is gated by the clock gating circuit 190B with the latch output signal L-EN. In FIG. 7, the clock signal CPN during the time window from time t+ to t7 (when the latch output signal L-EN is at logic HIGH) is transmitted to the output terminal 199 of the clock gating circuit 190B as the gated clock signal G-CPN. The logic values of the gated clock signal G-CPN during the time periods from time t0 to time t+ and from time t7 to time t9 (when the latch output signal L-EN is at logic LOW) are kept at logic HIGH.

In FIG. 7, even though the enable signal E is changed from logic HIGH to logic LOW at time t− and is further kept at logic LOW from time t− to time t7, the latch output signal L-EN does not follow the enable signal E to become logic LOW from time t− to time t7, as the latch output signal L-EN is latched as logic HIGH until time t7. The latching of the latch output signal L-EN as logic HIGH until the next rising edge (e.g., time t7) of the clock signal CPN allows the gated clock signal G-CPN to maintain the same duty cycle as the original clock signal CPN. The latching of the latch output signal L-EN until the next rising falling edge of the clock signal CPN ensures negative pulses of the clock signal CPN pass through the enabling latch circuit 100 as complete pulses. As a comparison, in some alternative designs, if the enable signal E is directly coupled to the first input terminal 191 of the clock gating circuit 190B, the last negative pulse will be truncated by the falling edge of the enable signal E. For example, with the alternative designs, if the clock signal CPN in FIG. 7 is gated directly with the enable signal E, a first portion of the last negative pulse from time t6 to t− will pass the clock gating circuit as a narrowed negative pulse with logic LOW, but a second portion of the last negative pulse from time t− to t7 will be set to logic HIGH by the clock gating circuit. As the relative time difference between the falling edge (e.g., t−) of the enable signal E and the falling edge (e.g., t6) of the last negative pulse changes, the pulse width (which is the difference between t− and t6) of the last negative pulse in the gated clock signal G-CPN changes accordingly. If the gated clock signal G-CPN is used as the clock for synchronizing and controlling a synchronous logic circuit, the pulse width variations may introduce uncertainties in the operation of a synchronous logic circuit and reduce the operation reliability. In the present disclosure, using the latch output signal L-EN to generate the gated clock signal G-CPN removes the pulse width variations, which eliminates the reliability concerns due to pulse width variations in the gated clock signal G-CPN.

Similar to the enabling latch circuit 600 in FIG. 6, the enabling latch circuit 300A-300C, 400, and 500A-500C in FIGS. 8A-8C, FIG. 9, and FIGS. 10A-10C are also used for generating a gated clock signal G-CPN from the clock signal CPN. Similar to the integrated circuit in FIG. 6, in each of the integrated circuits as shown in FIGS. 8A-8C, FIG. 9, and FIGS. 10A-10C, the input of the first inverter 62 of the clock logic circuit 60 also receives a clock signal CPN, and the latch output signal L-EN at the output 109 of the enabling latch circuit 600 in FIG. 6 is coupled to the first input of the clock gating circuit 190B for gating the clock signal CPN. Similar to the integrated circuit in FIG. 6, in each of the integrated circuits as shown in FIGS. 8A-8C, FIG. 9, and FIGS. 10A-10C, the second input of the clock gating circuit 190B receives the clock signal CPN.

Figure 8A:
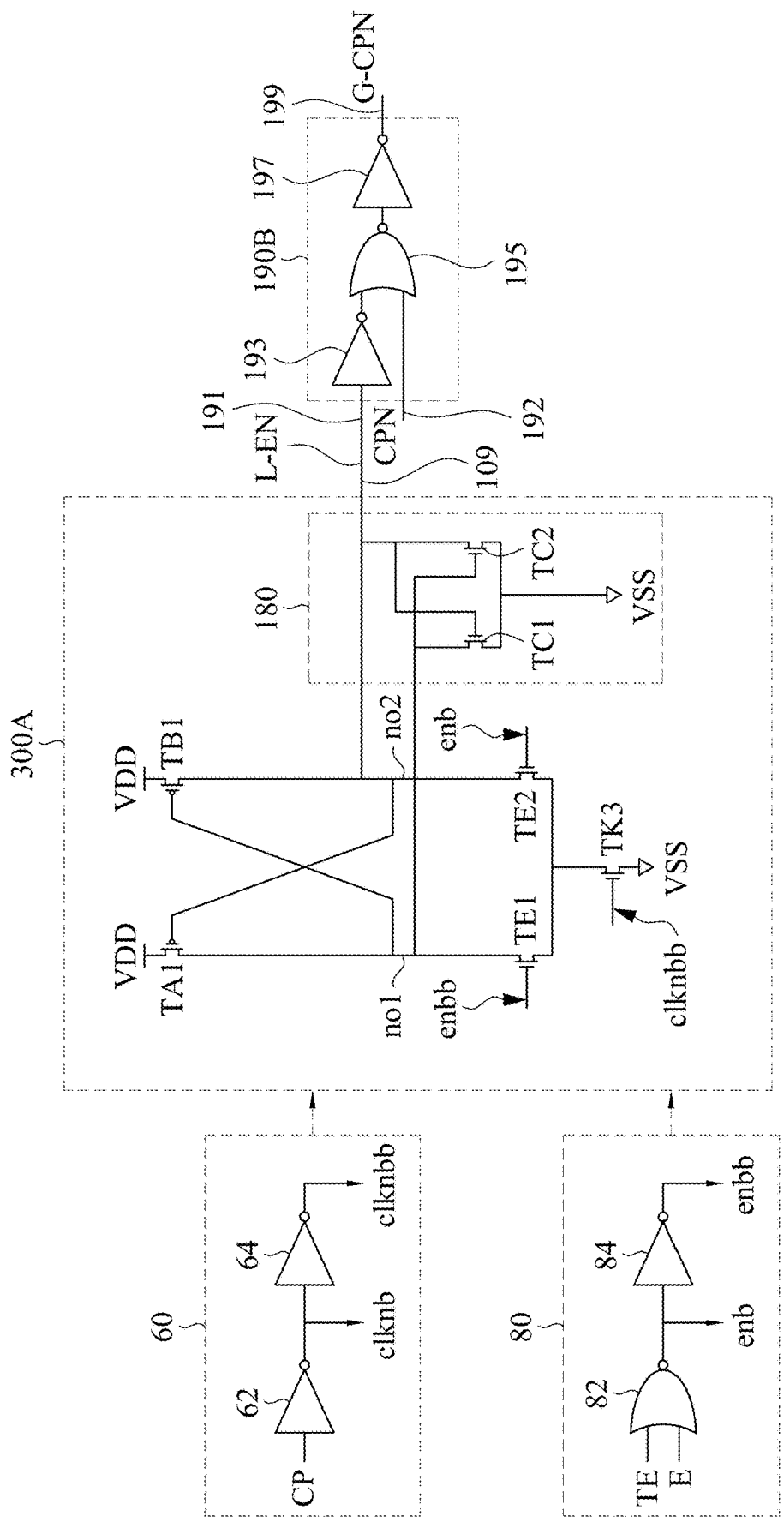
FIGS. 8A-8C are circuit diagrams of integrated circuits having enabling latch circuits configured to generate a latch output signal, in accordance with some embodiments.
Figure 8B:
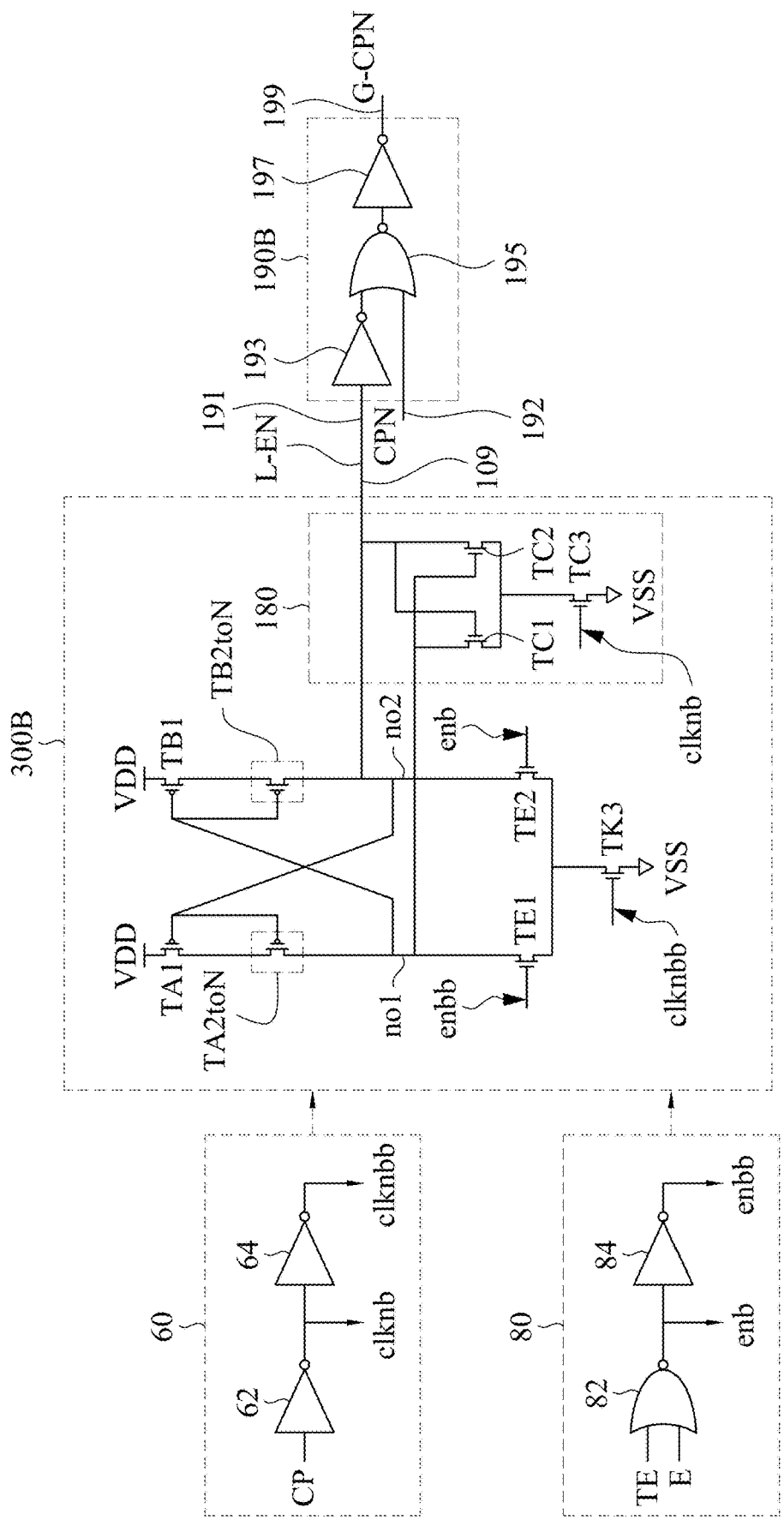
Figure 8C:
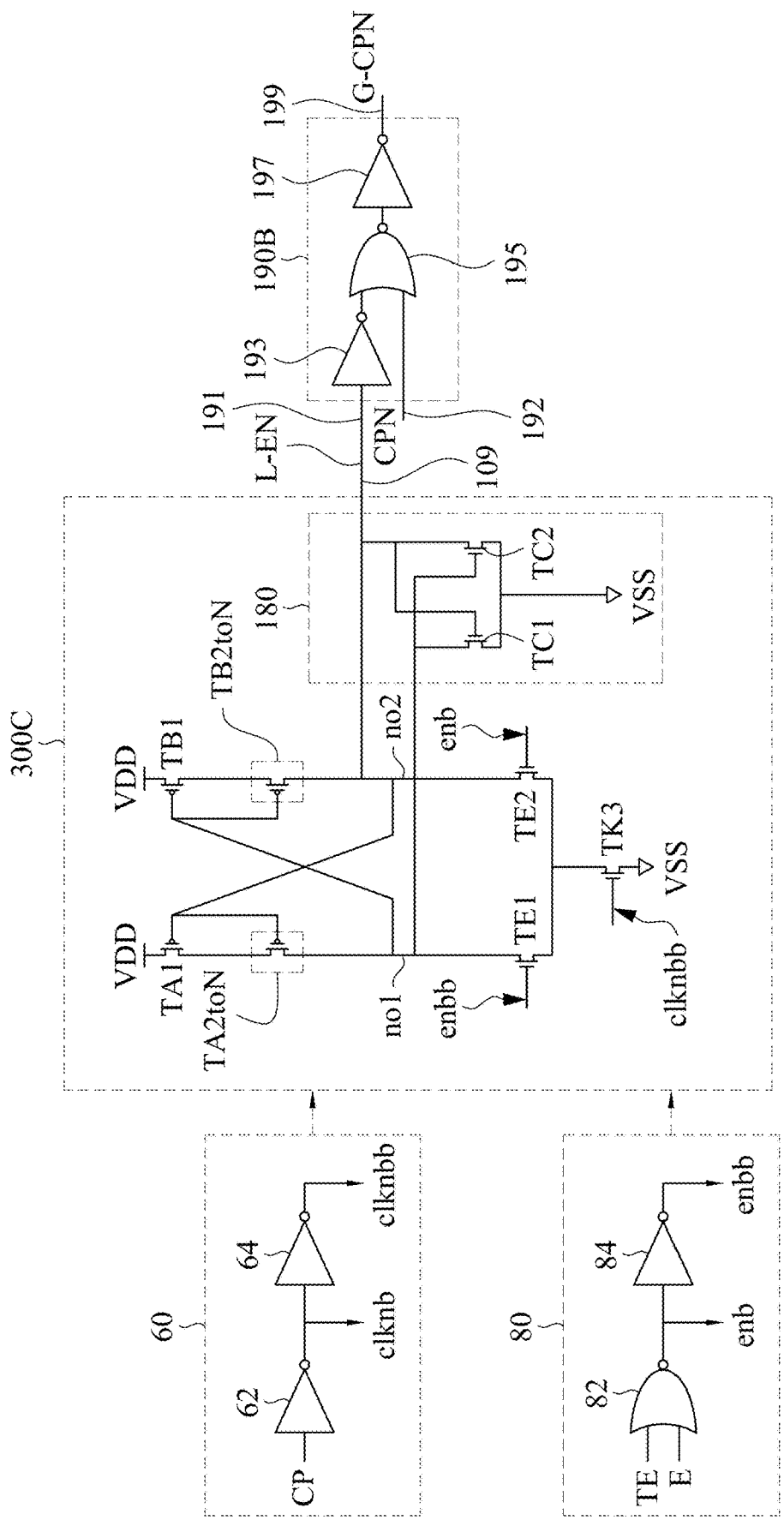

FIGS. 8A-8C are circuit diagrams of integrated circuits having enabling latch circuits 300A-300C configured to generate the latch output signal L-EN for gating the clock signal CPN to generate the gated clock signal G-CPN, in accordance with some embodiments. The integrated circuit in FIG. 8A is a modification of the integrated circuit in FIG. 3A. The integrated circuit in FIG. 8B is a modification of the integrated circuit in FIG. 3B. The integrated circuit in FIG. 8C is a modification of the integrated circuit in FIG. 3C. In each of the integrated circuits as shown in FIGS. 8A-8C, the gate terminal of the clocking transistor TK3 receives the clock signal clknbb from the output of the second inverter 64 of the clock logic circuit 60. In contrast, in each of the integrated circuits as shown in FIGS. 3A-3C, the gate terminal of the clocking transistor TK3 receives the clock signal clkb from the output of the first inverter 62. Additionally, in the integrated circuits as shown in FIG. 8B, the gate terminal of the coupling transistor TC3 receives the clock signal clknb from the output of the first inverter 62. In contrast, in the integrated circuits as shown in FIG. 3B, the gate terminal of the coupling transistor TC3 receives the clock signal clkbb from the output of the second inverter 64.

Figure 9:
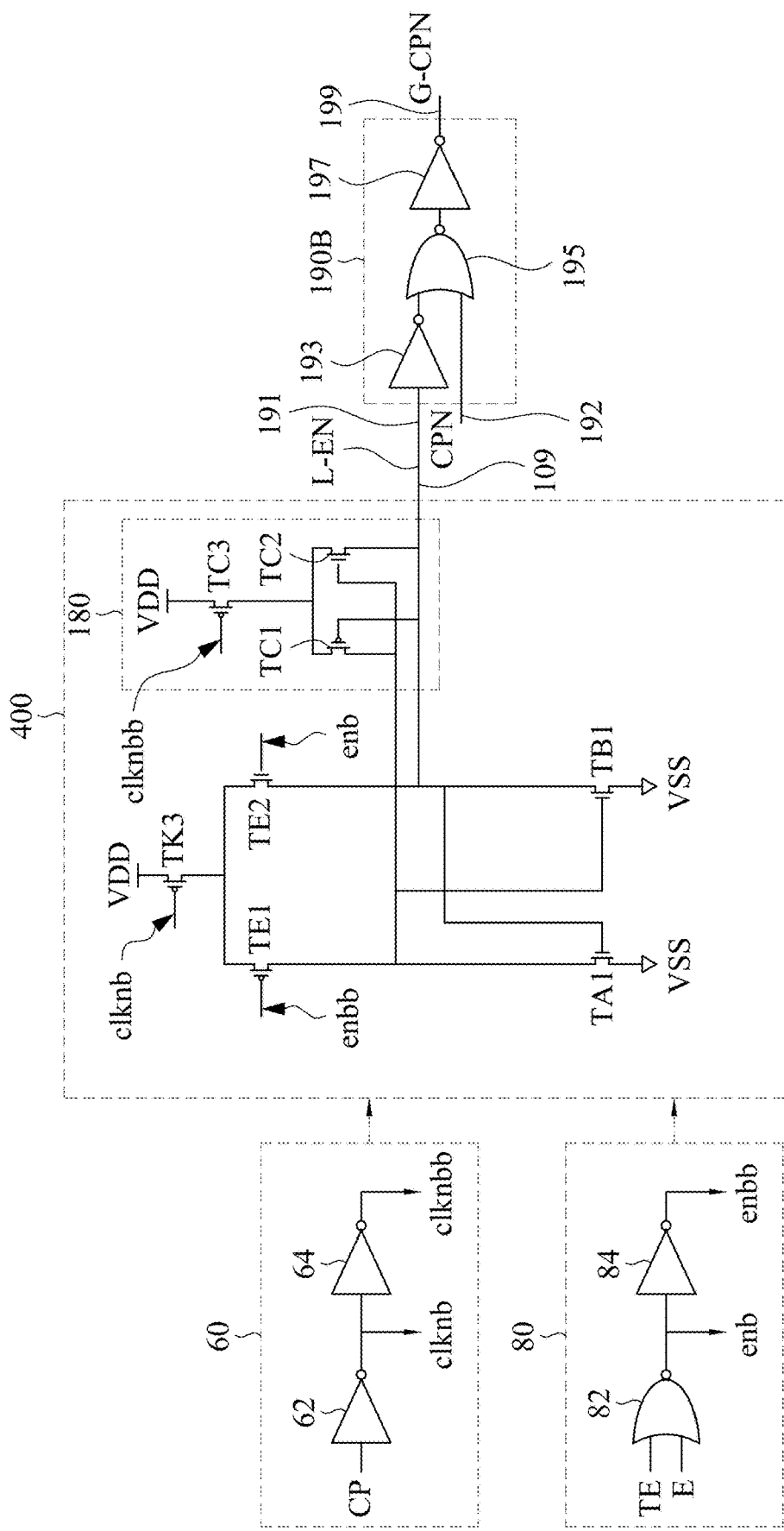
FIG. 9 is a circuit diagram of an integrated circuit having an enabling latch circuit configured to generate a latch output signal, in accordance with some embodiments.

FIG. 9 is a circuit diagram of an integrated circuits 400 having an enabling latch circuit configured to generate the latch output signal L-EN for gating the clock signal CPN to generate the gated clock signal G-CPN, in accordance with some embodiments. The integrated circuit in FIG. 9 is a modification of the integrated circuit in FIG. 4. In the integrated circuit of FIG. 9, the gate terminal of the clocking transistor TK3 receives the clock signal clknb from the output of the first inverter 62 of the clock logic circuit 60, and the gate terminal of the coupling transistor TC3 receives the clock signal clknbb from the output of the second inverter 64. In contrast, in the integrated circuit of FIG. 4, the gate terminal of the clocking transistor TK3 receives the clock signal clkbb from the output of the second inverter 64, and the gate terminal of the coupling transistor TC3 receives the clock signal clkb from the output of the first inverter 62.

Figure 10A:
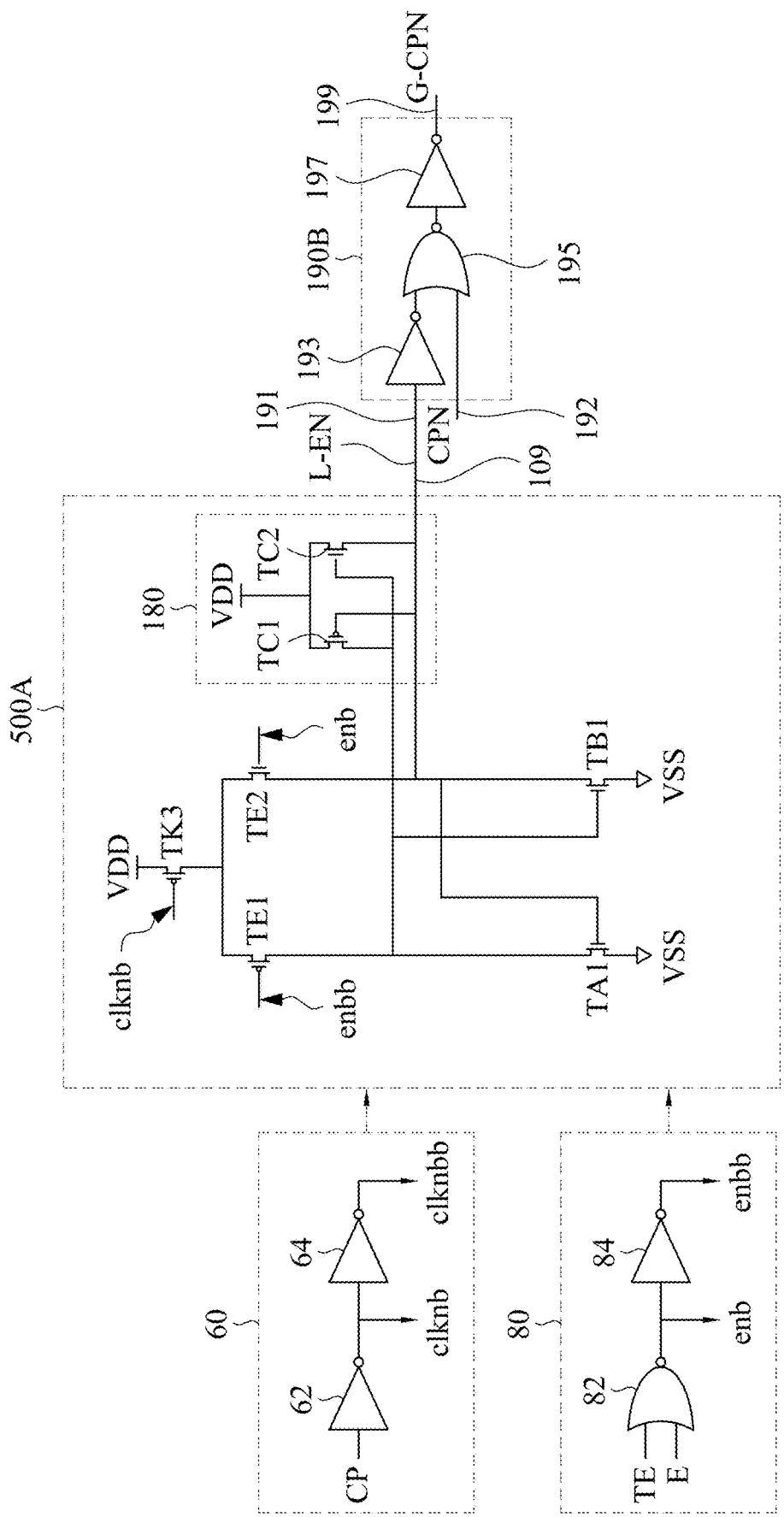
FIGS. 10A-10C are circuit diagrams of integrated circuits having enabling latch circuits configured to generate a latch output signal, in accordance with some embodiments.
Figure 10B:
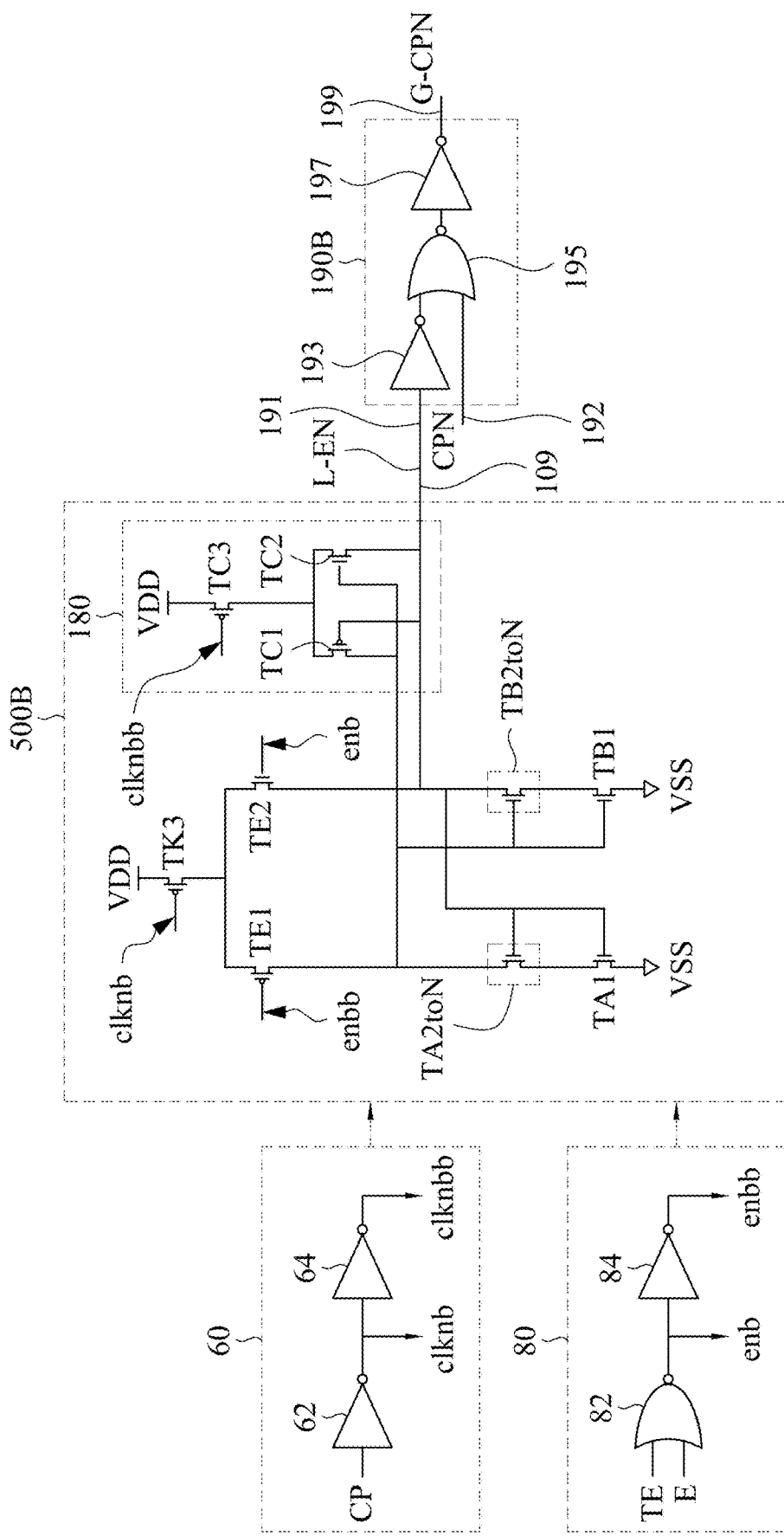
Figure 10C:
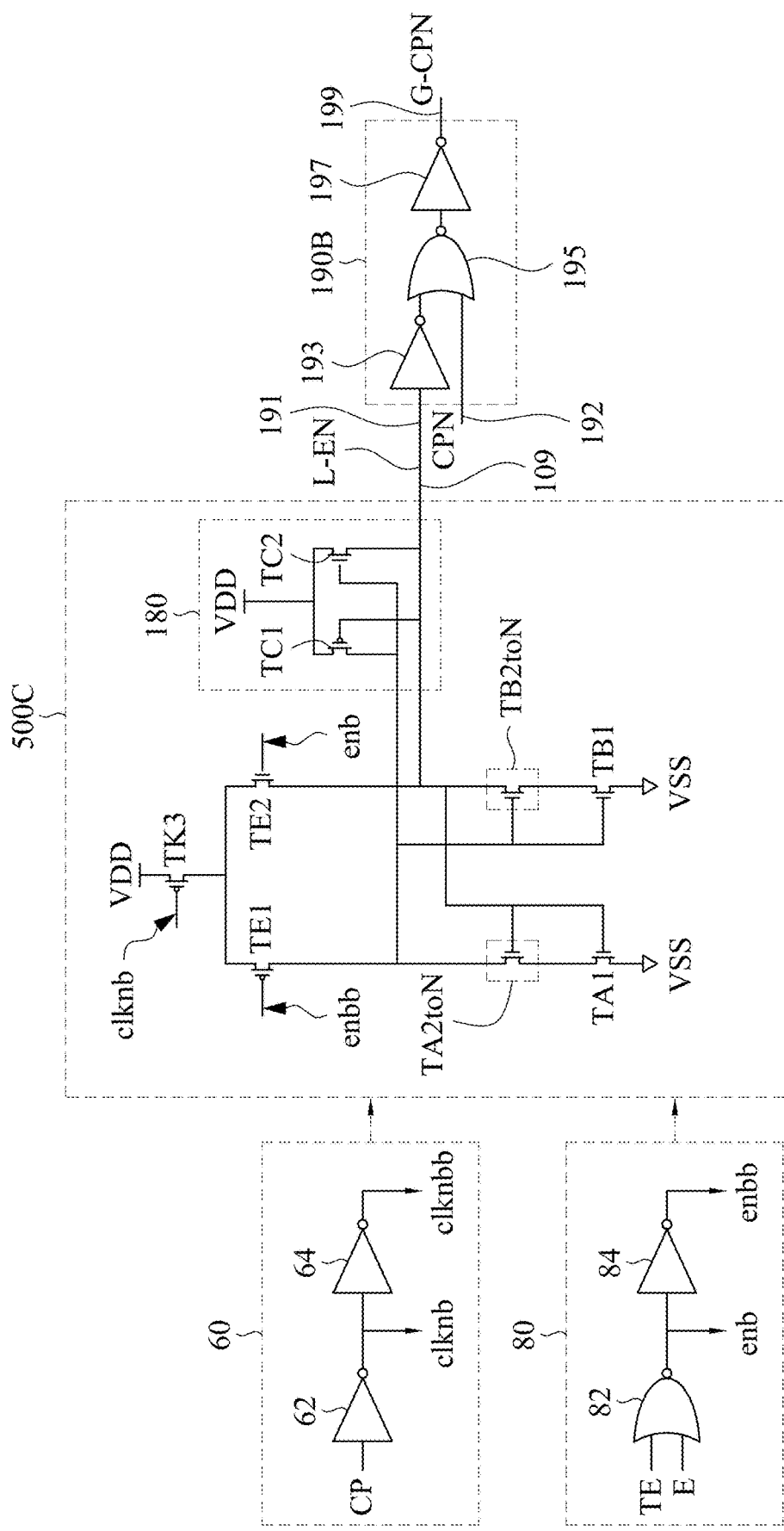

FIGS. 10A-10C are circuit diagrams of integrated circuits 500A-500C having enabling latch circuits configured to generate the latch output signal L-EN for gating the clock signal CPN to generate the gated clock signal G-CPN, in accordance with some embodiments. The integrated circuit in FIG. 10A is a modification of the integrated circuit in FIG. 5A. The integrated circuit in FIG. 10B is a modification of the integrated circuit in FIG. 5B. The integrated circuit in FIG. 10C is a modification of the integrated circuit in FIG. 5C.

In each of the integrated circuits as shown in FIGS. 10A-10C, the gate terminal of the clocking transistor TK3 receives the clock signal clknb from the output of the first inverter 62 of the clock logic circuit 60. In contrast, in each of the integrated circuits as shown in FIGS. 5A-5C, the gate terminal of the clocking transistor TK3 receives the clock signal clkbb from the output of the second inverter 64. Additionally, in the integrated circuits as shown in FIG. 10B, the gate terminal of the coupling transistor TC3 receives the clock signal clknbb from the output of the second inverter 64. In contrast, in the integrated circuits as shown in FIG. 5B, the gate terminal of the coupling transistor TC3 receives the clock signal clkb from the output of the first inverter 62.

Figure 11:
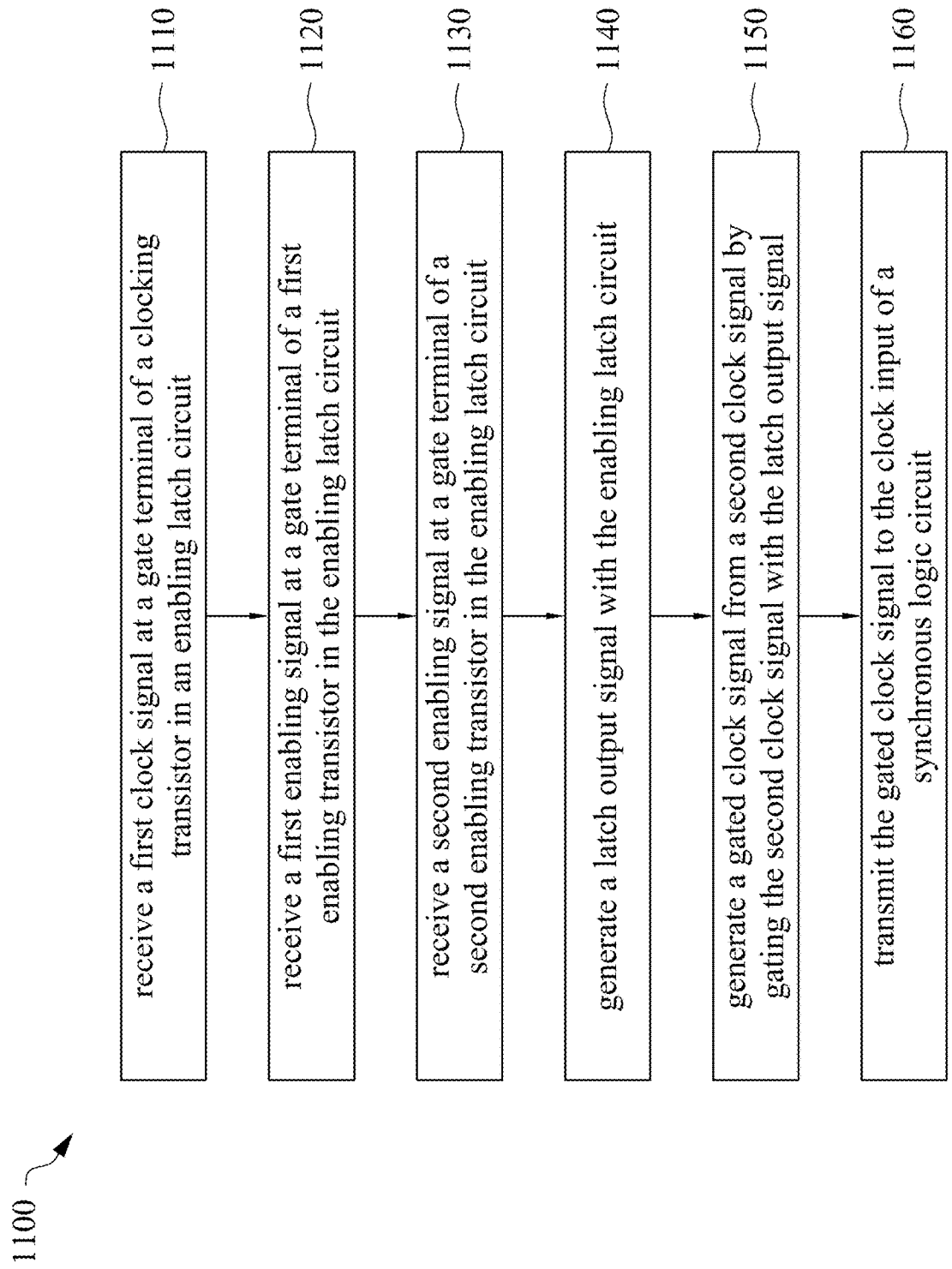
FIG. 11 is a flowchart of a method of generating a gated clock signal, in accordance with some embodiments.

FIG. 11 is a flowchart of a method 1100 of generating a gated clock signal coupled to the clock input of a synchronous logic circuit, in accordance with some embodiments. Method 1100 is usable with the enabling latch circuits 100, 300A-300C, 400, and 500A-500C in FIG. 1, FIGS. 3A-3C, FIG. 4, and FIGS. 5A-5C. Method 1100 is also usable with the enabling latch circuits 600, 300A-300C, 400, and 500A-500C in FIG. 6, FIGS. 8A-8C, FIG. 9, and FIGS. 10A-10C.

The sequence in which the operations of method 1100 are depicted in FIG. 11 is for illustration only; the operations of method 1100 are capable of being executed in sequences that differ from that depicted in FIG. 11. In some embodiments, operations in addition to those depicted in FIG. 11 are performed before, between, during, and/or after the operations depicted in FIG. 11.

In operation 1110 of method 1100, a first clock signal is received at a gate terminal of a clocking transistor in an enabling latch circuit. In the example embodiments of FIG. 1, FIGS. 3A-3C, FIG. 9, and FIGS. 10A-10C, the gate terminal of the clocking transistor TK3 receives the first clock signal from the output of the first inverter 62 of the clock logic circuit 60. In FIG. 1 and FIGS. 3A-3C, the first clock signal at the output of the first inverter 62 is the clock signal clkb generated from the clock signal CP. In FIG. 9 and FIGS. 10A-10C, the first clock signal at the output of the first inverter 62 is the clock signal clknb generated from the clock signal CPN. In the example embodiments of FIG. 4, FIGS. 5A-5C, FIG. 6, and FIGS. 8A-8C, the gate terminal of the clocking transistor TK3 receives the first clock signal from the output of the second inverter 64 of the clock logic circuit 60. In FIG. 4 and FIGS. 5A-5C, the first clock signal at the output of the second inverter 64 is the clock signal clkbb generated from the clock signal CP. In FIG. 6 and FIGS. 8A-8C, the first clock signal at the output of the second inverter 64 is the clock signal clknbb generated from the clock signal CPN.

In operation 1120 of method 1100, a first enabling signal is received at a gate terminal of a first enabling transistor in the enabling latch circuit. In the example embodiments of FIG. 1, FIGS. 3A-3C, FIG. 4, and FIGS. 5A-5C and in the example embodiments of FIG. 6, FIGS. 8A-8C, FIG. 9, and FIGS. 10A-10C, the gate terminal of the enabling transistor TE1 receives enabling signal enbb from the output of the inverter 84 in the enabling logic circuit 80.

In operation 1130 of method 1100, a second enabling signal is received at a gate terminal of a second enabling transistor in the enabling latch circuit. In the example embodiments of FIG. 1, FIGS. 3A-3C, FIG. 4, and FIGS. 5A-5C and in the example embodiments of FIG. 6, FIGS. 8A-8C, FIG. 9, and FIGS. 10A-10C, the gate terminal of the enabling transistor TE2 receives enabling signal enb from the output of the NOR gate 82 in the enabling logic circuit 80. The second enabling signal for controlling the enabling transistor TE2 is a logic inverse of the first enabling signal for controlling the enabling transistor TE1.

In operation 1140 of method 1100, a latch output signal is generated with the enabling latch circuit. In some embodiments, the latch output signal is latched to the logic level of a first node signal at a gate terminal of a branch-two transistor. In some embodiments, the latch output signal is latched to the logic level of a second node signal at a gate terminal of a branch-one transistor (TA1). In the example embodiments of FIG. 1, FIGS. 3A-3C, FIG. 4, and FIGS. 5A-5C, the latch output signal L-EN is latched to the logic value of the second node signal on the second node no2 at the time of the rising edge of the clock signal CP. In the example embodiments of FIG. 6, FIGS. 8A-8C, FIG. 9, and FIGS. 10A-10C, the latch output signal L-EN is latched to the logic value of the second node signal on the second node no2 at the time of the falling edge of the clock signal CPN.

In operation 1150 of method 1100, a gated clock signal is generated from a second clock signal by gating the second clock signal with the latch output signal. In the example embodiments of FIG. 1, FIGS. 3A-3C, FIG. 4, and FIGS. 5A-5C, the gated clock signal G-CP at the output terminal 199 of the clock gating circuit 190 is generated from the clock signal CP by gating the clock signal CP with the latch output signal L-EN. In the example embodiments of FIG. 6, FIGS. 8A-8C, FIG. 9, and FIGS. 10A-10C, the gated clock signal G-CPN at the output terminal 199 of the clock gating circuit 190 is generated from the clock signal CPN by gating the clock signal CPN with the latch output signal L-EN.

In operation 1160 of method 1100, the gated clock signal is transmitted to the clock input of a synchronous logic circuit. Examples of using the gated clock signal to synchronize an example synchronous logic circuit are provided in FIGS. 12A-12B. A synchronous logic circuit is a digital circuit in which the changes in the state of memory elements are synchronized by a clock signal. One example of the memory elements is a flip-flop. The output of a flip-flop is constant until a rising edge or falling edge of the clock signal is received at the clock input of the flip-flop, and the logic value at the input of the flip-flop is latched into the output of the flip-flop and generated as the logic value at the output of the flip-flop.

Figure 12A:
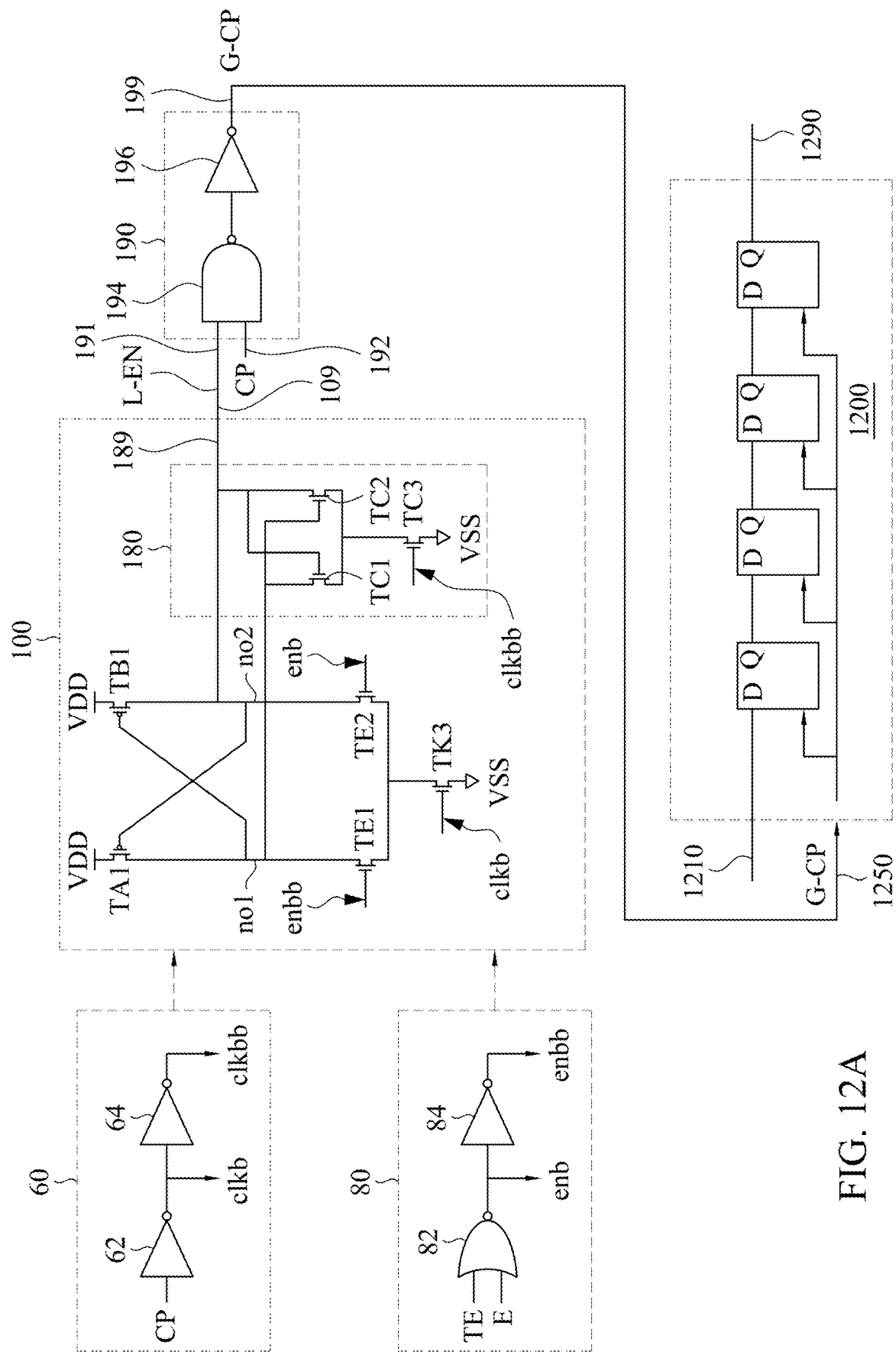
FIGS. 12A-12B are circuit diagrams of integrated circuits in which the gated clock signal is used as the clock signal for synchronizing a synchronous logic circuit, in accordance with some embodiments.
Figure 12B:
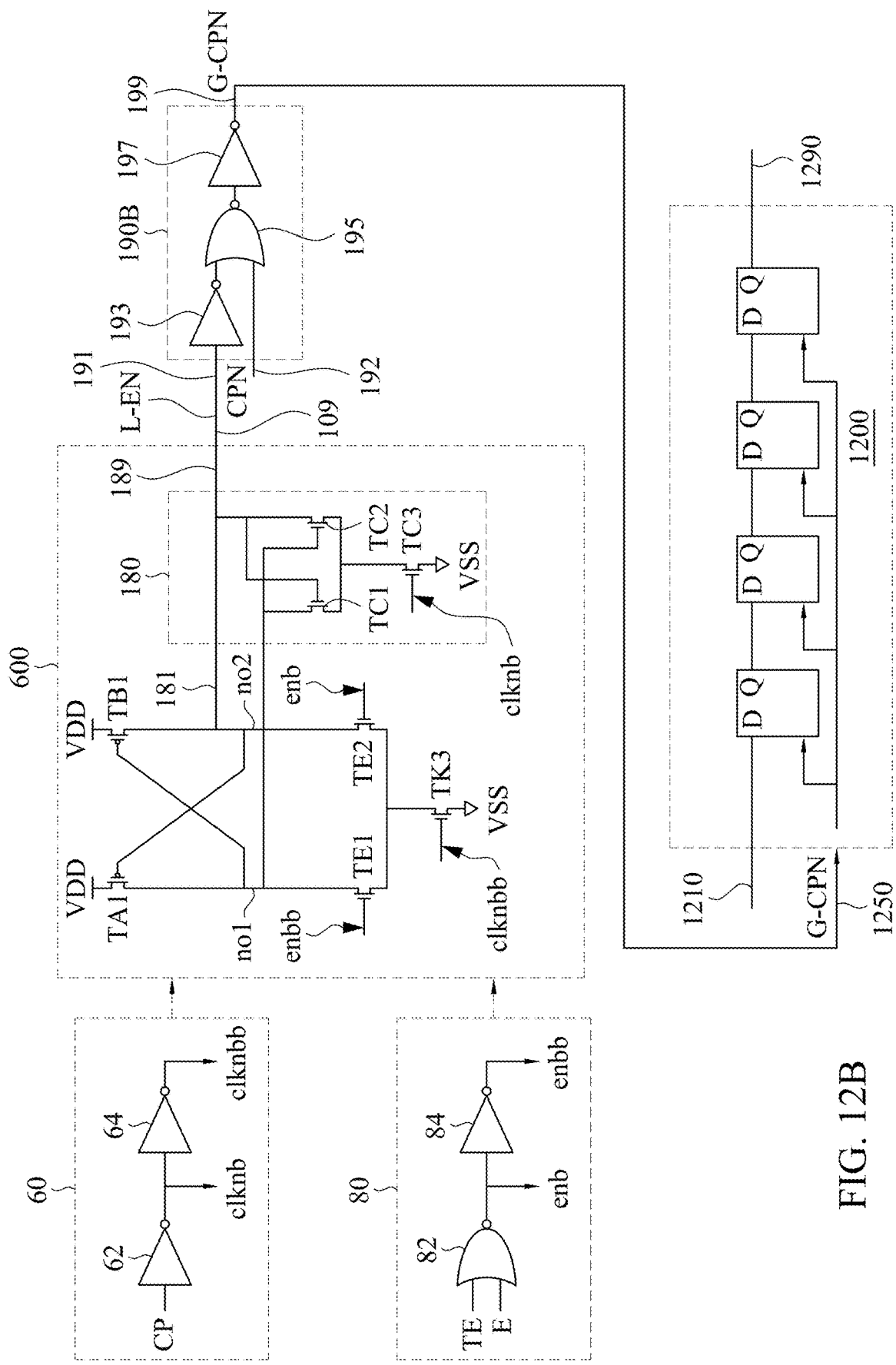

FIGS. 12A-12B are circuit diagrams of integrated circuits in which the gated clock signal is used as the clock signal for synchronizing a synchronous logic circuit, in accordance with some embodiments. The integrated circuit in FIG. 12A is a modification of the integrated circuit in FIG. 1. In FIG. 12A, the gated clock signal G-CP at the output terminal 199 of the clock gating circuit 190 is coupled to the clock input 1250 of the synchronous logic circuit 1200. The integrated circuit in FIG. 12B is a modification of the integrated circuit in FIG. 6. In FIG. 12B, the gated clock signal G-CPN at the output terminal 199 of the clock gating circuit 190B is coupled to the clock input 1250 of the synchronous logic circuit 1200. In FIGS. 12A-12B, the synchronous logic circuit 1200 is a shift register based on D type flip-flops. The shift register includes a serial input 1210 and a serial output 1290. The D type flip-flops are synchronized by the gated clock signal G-CPN received at the clock input 1250. The shift register in FIGS. 12A-12B is provided as an example, other types of synchronous logic circuits are within the contemplated scope of the present disclosure.

An aspect of the present disclosure relates to an integrated circuit. The integrated circuit includes a clocking transistor, a first enabling transistor, a second enabling transistor, a branch-one transistor, a branch-two transistor, and a clock gating circuit. The clocking transistor has a gate terminal configured to receive a first clock signal. The first enabling transistor has a semiconductor channel electrically connected between a drain terminal of the clocking transistor and a first node. The first enabling transistor has a gate terminal configured to receive a first enabling signal. The second enabling transistor has a semiconductor channel electrically connected between a drain terminal of the clocking transistor and a second node. The second enabling transistor has a gate terminal configured to receive a second enabling signal which is a logic inverse of the first enabling signal. The branch-one transistor has a semiconductor channel electrically connected between a first power supply and the first node and has a gate terminal electrically connected to the second node. The branch-two transistor has a semiconductor channel electrically connected between the first power supply and the second node and has a gate terminal electrically connected to the first node. The clock gating circuit has an output terminal configured to generate a gated clock signal and has a first input terminal configured to receive a latch output signal which is latched to a logic level of either a first node signal at the first node or a second node signal at the second node.

Another aspect of the present disclosure relates to a method. The method includes receiving a first clock signal at a gate terminal of a clocking transistor in an enabling latch circuit, receiving a first enabling signal at a gate terminal of a first enabling transistor in the enabling latch circuit, and receiving a second enabling signal at a gate terminal of a second enabling transistor in the enabling latch circuit. The second enabling signal is a logical inverse of the first enabling signal. The method also includes generating a latch output signal which either has an identical logic level as a first node signal at a gate terminal of a branch-two transistor or has identical logic level as a second node signal at a gate terminal of a branch-one transistor at an time when the latch output signal is latched. The method further includes generating a gated clock signal from a second clock signal by gating the second clock signal with the latch output signal. In the enabling latch circuit, the gate terminal of the branch-one transistor is electrically connected to both a drain terminal of the branch-two transistor and a drain terminal of the second enabling transistor. The gate terminal of the branch-two transistor is electrically connected to both a drain terminal of the branch-one transistor and a drain terminal of the first enabling transistor.

Still another aspect of the present disclosure relates to an integrated circuit. The integrated circuit includes a clocking transistor, a first enabling transistor, a second enabling transistor, a plurality of branch-one transistors, and a plurality of branch-two transistors. The clocking transistor has a gate terminal configured to receive a first clock signal. The first enabling transistor has a semiconductor channel electrically connected between a drain terminal of the clocking transistor and a first node. The first enabling transistor has a gate terminal configured to receive a first enabling signal. The second enabling transistor has a semiconductor channel electrically connected between a drain terminal of the clocking transistor and a second node. The second enabling transistor has a gate terminal configured to receive a second enabling signal, the second enabling signal is a logical inverse of the first enabling signal. The branch-one transistors have semiconductor channels electrically connected in series between a first power supply and the first node, and each branch-one transistor has a gate terminal electrically connected to the second node. The branch-two transistors have semiconductor channels electrically connected in series between the first power supply and the second node, and each branch-two transistor has a gate terminal electrically connected to the first node.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An integrated circuit comprising:
   a clocking transistor having a gate terminal configured to receive a first clock signal;
   a first enabling transistor having a semiconductor channel electrically connected between a drain terminal of the clocking transistor and a first node, wherein the first enabling transistor has a gate terminal configured to receive a first enabling signal;
   a second enabling transistor having a semiconductor channel electrically connected between a drain terminal of the clocking transistor and a second node, wherein the second enabling transistor has a gate terminal configured to receive a second enabling signal which is a logic inverse of the first enabling signal;
   a branch-one transistor having a semiconductor channel electrically connected between a first power supply and the first node and having a gate terminal electrically connected to the second node, wherein a source terminal of the branch-one transistor is configured to be maintained at a constant supply voltage on the first power supply, wherein the clocking transistor has a source terminal electrically connected to a second power supply;
   a branch-two transistor having a semiconductor channel electrically connected between the first power supply and the second node and having a gate terminal electrically connected to the first node, wherein a source terminal of the branch-two transistor is configured to be maintained at the constant supply voltage on the first power supply;
   a clock gating circuit having an output terminal configured to generate a gated clock signal and having a first input terminal configured to receive a latch output signal which is latched to a logic level of either a first node signal at the first node or a second node signal at the second node; and
   a coupling circuit configured to generate the latch output signal from at least one of the first node signal at the first node or the second node signal at the second node.

2. The integrated circuit of claim 1, further comprising:
   a synchronous logic circuit having a clock input configured to receive the gated clock signal generated from a second clock signal by gating the second clock signal with the latch output signal.

3. The integrated circuit of claim 1, wherein the clock gating circuit has a second input terminal configured to receive a second clock signal, and wherein the second clock signal either has a same waveform as the first clock signal or has a logic inverse waveform as the first clock signal.

4. The integrated circuit of claim 1, wherein the coupling circuit comprises:
   a first coupling transistor having a gate terminal electrically connected to the second node and having a drain terminal electrically connected to the first node; and
   a second coupling transistor having a gate terminal electrically connected to the first node and having a drain terminal electrically connected to the second node.

5. The integrated circuit of claim 4, wherein each of the first coupling transistor and the second coupling transistor has a source terminal configured to have a constant voltage.

6. The integrated circuit of claim 4, further comprising:
   a third coupling transistor having a source terminal electrically connected to the second power supply and having a gate terminal configured to receive a second clock signal, wherein the second clock signal is a logical inverse of the first clock signal; and
   wherein each of the first coupling transistor and the second coupling transistor has a source terminal electrically connected to a drain terminal of the third coupling transistor.

7. The integrated circuit of claim 1, wherein each of the clocking transistor, the first enabling transistor, and the second enabling transistor is a first-type transistor, wherein each of the branch-one transistor and the branch-two transistor is a second-type transistor, and wherein each first-type transistor is an NMOS transistor and each second-type transistor is a PMOS transistor.

8. The integrated circuit of claim 1, wherein:
each of the clocking transistor, the first enabling transistor, and the second enabling transistor is a first-type transistor of a reduced threshold; and
each of the branch-one transistor and the branch-two transistor is a second-type transistor of a default threshold.

9. The integrated circuit of claim 1, wherein:
each of the clocking transistor, the first enabling transistor, and the second enabling transistor is a first-type transistor having an enhanced driving strength, the enhanced driving strength being larger than a default driving strength of another first-type transistor.

10. The integrated circuit of claim 1, wherein each of the clocking transistor, the first enabling transistor, and the second enabling transistor is a first-type transistor, wherein each of the branch-one transistor and the branch-two transistor is a second-type transistor, and wherein each first-type transistor is a PMOS transistor and each second-type transistor is an NMOS transistor.

11. A method comprising:
receiving a first clock signal at a gate terminal of a clocking transistor in an enabling latch circuit;
receiving a first enabling signal at a gate terminal of a first enabling transistor in the enabling latch circuit;
receiving a second enabling signal at a gate terminal of a second enabling transistor in the enabling latch circuit, wherein the second enabling signal is a logical inverse of the first enabling signal;
generating a latch output signal which either has an identical logic level as a first node signal at a gate terminal of a branch-two transistor or has identical logic level as a second node signal at a gate terminal of a branch-one transistor at a time when the latch output signal is latched;
generating a gated clock signal from a second clock signal by gating the second clock signal with the latch output signal;
maintaining source terminals of the branch-one transistor and the branch-two transistor at a first supply voltage, and maintaining a source terminal of the clocking transistor at a second supply voltage;
wherein the gate terminal of the branch-one transistor is electrically connected to both a drain terminal of the branch-two transistor and a drain terminal of the second enabling transistor, and wherein the gate terminal of the branch-two transistor is electrically connected to both a drain terminal of the branch-one transistor and a drain terminal of the first enabling transistor;
receiving the first node signal at both a drain terminal of a first coupling transistor and a gate terminal of a second coupling transistor; and
receiving the second node signal at both a drain terminal of the second coupling transistor and a gate terminal of the first coupling transistor.

12. The method of claim 11, further comprising:
transmitting the gated clock signal to a clock input of a synchronous logic circuit.

13. The method of claim 11, wherein generating the latch output signal further comprises:
maintaining source terminals of both the first coupling transistor and the second coupling transistor at a constant voltage.

14. The method of claim 11, wherein generating the latch output signal further comprises:
maintaining a source terminal of a third coupling transistor at a constant voltage, and wherein a drain terminal of the third coupling transistor is electrically connected to source terminals of both the first coupling transistor and the second coupling transistor at a constant voltage; and
receiving a third clock signal at a gate terminal of the third coupling transistor.

15. The method of claim 11, wherein generating the gated clock signal comprises:
receiving the latch output signal at a first input terminal of a clock gating circuit;
receiving the second clock signal at a second input terminal of the clock gating circuit; and
transmitting the second clock signal to an output terminal of the clock gating circuit based upon a logic level of the latch output signal.

16. The method of claim 11, further comprising:
generating the latch output signal at the drain terminal of the second coupling transistor.

17. An integrated circuit comprising:
a clocking transistor having a gate terminal configured to receive a first clock signal;
a first enabling transistor having a semiconductor channel electrically connected between a drain terminal of the clocking transistor and a first node, wherein the first enabling transistor has a gate terminal configured to receive a first enabling signal;
a second enabling transistor having a semiconductor channel electrically connected between a drain terminal of the clocking transistor and a second node, wherein the second enabling transistor has a gate terminal configured to receive a second enabling signal, the second enabling signal is a logical inverse of the first enabling signal;
a plurality of branch-one transistors having semiconductor channels electrically connected in series between a first power supply and the first node, wherein each branch-one transistor has a gate terminal electrically connected to the second node, and wherein one of the branch-one transistors has a source terminal that is configured to be maintained at a constant supply voltage on the first power supply, wherein the clocking transistor has a source terminal electrically connected to a second power supply; and
a plurality of branch-two transistors having semiconductor channels electrically connected in series between the first power supply and the second node, wherein each branch-two transistor has a gate terminal electrically connected to the first node, and wherein one of the branch-two transistors has a source terminal that is configured to be maintained at the constant supply voltage on the first power supply.

18. The integrated circuit of claim 17, further comprising:
a coupling circuit configured to receive at least one of a first node signal from the first node or a second node signal from the second node and further configured to generate a latch output signal which is latched to a logic level of either the first node signal or the second node signal.

19. The integrated circuit of claim 18, further comprising:
a synchronous logic circuit having a clock input configured to receive a gated clock signal generated from a second clock signal by gating the second clock signal with the latch output signal.

20. The integrated circuit of claim 17, wherein each of the clocking transistor, the first enabling transistor, and the second enabling transistor is a first-type transistor, wherein each of the branch-one transistors and the branch-two transistors is a second-type transistor.

* * * * *